United States Patent
VanderZanden et al.

(10) Patent No.: US 11,625,033 B2
(45) Date of Patent: Apr. 11, 2023

(54) REMOTELY CONTROLLING USE OF AN ON-DEMAND ELECTRIC VEHICLE

(71) Applicant: Bird Rides, Inc., Santa Monica, CA (US)

(72) Inventors: Travis VanderZanden, Santa Monica, CA (US); William Scott Rushforth, Los Angeles, CA (US)

(73) Assignee: Bird Rides, Inc., Santa Monica, CA (US)

( * ) Notice: Subject to any disclaimer, the term of this patent is extended or adjusted under 35 U.S.C. 154(b) by 0 days.

(21) Appl. No.: 17/532,808

(22) Filed: Nov. 22, 2021

(65) Prior Publication Data

US 2022/0155777 A1 May 19, 2022

Related U.S. Application Data

(63) Continuation of application No. 16/382,732, filed on Apr. 12, 2019, now Pat. No. 11,215,981.

(60) Provisional application No. 62/671,840, filed on May 15, 2018, provisional application No. 62/660,857, filed on Apr. 20, 2018.

(51) Int. Cl.
- *B60R 25/24* (2013.01)
- *G05D 1/00* (2006.01)
- *G05D 1/02* (2020.01)
- *G06Q 30/06* (2012.01)
- *G06Q 30/0645* (2023.01)

(52) U.S. Cl.
CPC ............ *G05D 1/0011* (2013.01); *B60R 25/24* (2013.01); *G05D 1/0291* (2013.01); *G06Q 30/0645* (2013.01)

(58) Field of Classification Search
CPC .... G05D 1/0011; G05D 1/0291; B60R 25/24; G06Q 30/0645
USPC .......................................................... 701/2
See application file for complete search history.

(56) References Cited

U.S. PATENT DOCUMENTS

| | | | |
|---|---|---|---|
| 6,378,815 | B1 | 4/2002 | Lee |
| 6,472,771 | B1 | 10/2002 | Frese |

(Continued)

FOREIGN PATENT DOCUMENTS

| | | |
|---|---|---|
| CN | 102013137 | 4/2011 |
| CN | 102667655 | 9/2012 |

(Continued)

OTHER PUBLICATIONS

Co-Pending U.S. Appl. No. 15/976,303, filed May 10, 2018.

(Continued)

*Primary Examiner* — Abby Y Lin
*Assistant Examiner* — Hossam M Abd El Latif
(74) *Attorney, Agent, or Firm* — Van Pelt, Yi & James LLP

(57) ABSTRACT

Remotely controlling use of an on demand electric vehicle is disclosed. In various embodiments, data associated with a vehicle is received via a communication interface. A determination is made based at least in part on the receive data that a condition associated with control of the vehicle is satisfied. In response to the determination, a communication to control the vehicle remotely in a manner associated with the condition is generated and sent to the vehicle. The vehicle includes a control module configured to control a controlled component comprising the vehicle in a manner indicated by the control communication.

20 Claims, 15 Drawing Sheets

(56) References Cited

U.S. PATENT DOCUMENTS

| | | |
|---|---|---|
| 6,850,898 B1 | 2/2005 | Murakami |
| 6,941,197 B1 | 9/2005 | Murakami |
| 6,947,881 B1 | 9/2005 | Murakami |
| 7,181,409 B1 | 2/2007 | Murakami |
| 8,627,990 B2 | 1/2014 | Nakajima |
| 8,635,091 B2 | 1/2014 | Amigo |
| 8,662,528 B1 | 3/2014 | Abdulaziz |
| 8,727,192 B2 | 5/2014 | Lai |
| 8,738,212 B1 | 5/2014 | Schieffelin |
| 8,849,237 B2 | 9/2014 | Bourdu |
| 8,918,231 B2 | 12/2014 | Rovik |
| 8,983,704 B2 | 3/2015 | Schieffelin |
| 8,998,048 B1 | 4/2015 | Wu |
| 9,045,102 B2 | 6/2015 | Caratto |
| 9,168,975 B1 | 10/2015 | Schieffelin |
| 9,171,268 B1 | 10/2015 | Penilla |
| 9,189,900 B1 | 11/2015 | Penilla |
| 9,194,168 B1 | 11/2015 | Lu |
| 9,229,623 B1 | 1/2016 | Penilla |
| 9,288,270 B1 | 3/2016 | Penilla |
| 9,415,833 B2 | 8/2016 | Schieffelin |
| 9,569,966 B2 | 2/2017 | Bobbitt |
| 9,586,559 B2 | 3/2017 | Keating |
| 9,586,599 B2 | 3/2017 | Filev |
| 9,656,672 B2 | 5/2017 | Schieffelin |
| 9,738,255 B2 | 8/2017 | Keating |
| 10,023,266 B2 | 7/2018 | Contello |
| 10,086,796 B2 | 10/2018 | Keating |
| 10,109,006 B2 | 10/2018 | Yan |
| 10,262,484 B2 | 4/2019 | Conrad |
| 10,358,133 B2 | 7/2019 | Schieffelin |
| 10,434,985 B2 | 10/2019 | Keating |
| 10,607,492 B2 | 3/2020 | Vanderzanden |
| 10,974,782 B2 | 4/2021 | Foley |
| 11,100,346 B2 | 8/2021 | Beaurepaire |
| 11,215,981 B2 | 1/2022 | Vanderzanden |
| 11,263,690 B2 | 3/2022 | Vanderzanden |
| 11,468,503 B2 | 10/2022 | Vanderzanden |
| 2002/0174077 A1 | 11/2002 | Yui |
| 2002/0186144 A1 | 12/2002 | Meunier |
| 2003/0078707 A1 | 4/2003 | Shioda |
| 2004/0012261 A1 | 1/2004 | Albert |
| 2004/0075541 A1 | 4/2004 | Simoneau |
| 2004/0108348 A1 | 6/2004 | Barnes |
| 2004/0119610 A1 | 6/2004 | Maemura |
| 2005/0144048 A1 | 6/2005 | Belanger |
| 2006/0108167 A1 | 5/2006 | Finger |
| 2007/0045495 A1 | 3/2007 | Asano |
| 2007/0168104 A1 | 7/2007 | Nelson |
| 2007/0285209 A1 | 12/2007 | Heusi |
| 2008/0179478 A1 | 7/2008 | Lee |
| 2008/0201160 A1 | 8/2008 | Chang |
| 2009/0052071 A1 | 2/2009 | Chang |
| 2010/0075656 A1 | 3/2010 | Howarter |
| 2010/0089846 A1 | 4/2010 | Navarro Ruiz |
| 2010/0228405 A1 | 9/2010 | Morgal |
| 2011/0054735 A1 | 3/2011 | Kamiya |
| 2011/0060480 A1 | 3/2011 | Mottla |
| 2011/0112969 A1 | 5/2011 | Zaid |
| 2011/0148346 A1 | 6/2011 | Gagosz |
| 2011/0184789 A1 | 7/2011 | Kirsch |
| 2011/0213629 A1 | 9/2011 | Clark |
| 2012/0000720 A1 | 1/2012 | Honda |
| 2012/0286950 A1 | 11/2012 | Peariso |
| 2012/0330696 A1 | 12/2012 | Clark |
| 2013/0030581 A1 | 1/2013 | Luke |
| 2013/0030696 A1 | 1/2013 | Wu |
| 2013/0093585 A1 | 4/2013 | Ambani |
| 2013/0099892 A1 | 4/2013 | Tucker |
| 2013/0116892 A1 | 5/2013 | Wu |
| 2013/0134196 A1 | 5/2013 | Lee |
| 2013/0144482 A1 | 6/2013 | Tuukkanen |
| 2013/0164572 A1 | 6/2013 | Liao |
| 2013/0238167 A1 | 9/2013 | Stanfield |
| 2013/0317693 A1 | 11/2013 | Jefferies |
| 2013/0321178 A1 | 12/2013 | Jameel |
| 2013/0325521 A1 | 12/2013 | Jameel |
| 2014/0163774 A1 | 6/2014 | Demeniuk |
| 2014/0163797 A1 | 6/2014 | Schieffelin |
| 2014/0172192 A1 | 6/2014 | Kato |
| 2014/0172727 A1 | 6/2014 | Abhyanker |
| 2014/0188310 A1* | 7/2014 | Hatfield .............. B25J 9/1633 701/2 |
| 2014/0200742 A1 | 7/2014 | Mauti, Jr. |
| 2014/0218533 A1 | 8/2014 | Nerayoff et al. |
| 2014/0222298 A1 | 8/2014 | Gurin |
| 2014/0249751 A1 | 9/2014 | Ressayre |
| 2014/0343773 A1 | 11/2014 | Schieffelin |
| 2015/0046022 A1 | 2/2015 | Bai |
| 2015/0069969 A1 | 3/2015 | Wu |
| 2015/0291253 A1 | 10/2015 | Schieffelin |
| 2015/0339595 A1 | 11/2015 | Soutter |
| 2015/0339923 A1 | 11/2015 | König |
| 2015/0370253 A1 | 12/2015 | Gurin |
| 2016/0027307 A1 | 1/2016 | Abhyanker |
| 2016/0048777 A1 | 2/2016 | Kitagawa |
| 2016/0176472 A1 | 6/2016 | Schieffelin |
| 2016/0180721 A1 | 6/2016 | Otulic |
| 2016/0311334 A1 | 10/2016 | Moravick |
| 2016/0343068 A1 | 11/2016 | Barrois |
| 2017/0004712 A1 | 1/2017 | Yang |
| 2017/0008451 A1 | 1/2017 | Stanfield et al. |
| 2017/0008583 A1 | 1/2017 | Steinman |
| 2017/0039631 A1 | 2/2017 | Luke |
| 2017/0039668 A1* | 2/2017 | Luke .................. G06Q 10/06 |
| 2017/0061709 A1 | 3/2017 | Toya |
| 2017/0069154 A1 | 3/2017 | Hilton |
| 2017/0106866 A1 | 4/2017 | Schieffelin |
| 2017/0197584 A1 | 7/2017 | Keating |
| 2017/0234934 A1 | 8/2017 | Zhong |
| 2017/0282919 A1 | 10/2017 | Schieffelin |
| 2017/0364995 A1 | 12/2017 | Yan |
| 2018/0009414 A1 | 1/2018 | Keating |
| 2018/0056791 A1 | 3/2018 | Lee |
| 2018/0065544 A1 | 3/2018 | Brusco |
| 2018/0238698 A1 | 8/2018 | Pedersen |
| 2018/0315317 A1 | 11/2018 | Chen |
| 2019/0016384 A1 | 1/2019 | Carlson |
| 2019/0102858 A1 | 4/2019 | Pivnick |
| 2019/0118768 A1 | 4/2019 | Jeong |
| 2019/0248439 A1 | 8/2019 | Wang |
| 2019/0291800 A1 | 9/2019 | Yu |
| 2019/0311630 A1 | 10/2019 | Vanderzanden |
| 2019/0318419 A1 | 10/2019 | Vanderzanden |
| 2019/0324446 A1 | 10/2019 | Vanderzanden |
| 2020/0015048 A1 | 1/2020 | Mendes |
| 2020/0058065 A1 | 2/2020 | Vanderzanden |
| 2020/0124430 A1 | 4/2020 | Bradlow |
| 2020/0180718 A1 | 6/2020 | Foley |
| 2020/0180719 A1 | 6/2020 | Chadwick |
| 2020/0210729 A1 | 7/2020 | Beaurepaire |
| 2020/0236523 A1 | 7/2020 | Zhang |
| 2020/0250975 A1 | 8/2020 | Tang |
| 2020/0258393 A1 | 8/2020 | Vanderzanden |
| 2020/0356107 A1 | 11/2020 | Wells |
| 2020/0410375 A1 | 12/2020 | Seagraves |
| 2021/0005089 A1 | 1/2021 | Seagraves |
| 2021/0023952 A1 | 1/2021 | Sussna |
| 2021/0035032 A1 | 2/2021 | Foley |
| 2021/0096564 A1 | 4/2021 | Panigrahi |
| 2021/0116581 A1 | 4/2021 | Cooper |
| 2021/0125499 A1 | 4/2021 | Cooper |
| 2021/0178921 A1 | 6/2021 | French |
| 2021/0247196 A1 | 8/2021 | Wells |
| 2022/0138841 A1 | 5/2022 | Vanderzanden |
| 2022/0155777 A1 | 5/2022 | Vanderzanden |
| 2022/0398654 A1 | 12/2022 | Vanderzanden |

FOREIGN PATENT DOCUMENTS

| | | |
|---|---|---|
| CN | 204706096 | 10/2015 |
| CN | 206737501 | 12/2017 |
| DE | 102010043951 | 5/2012 |
| EP | 1271418 | 1/2003 |

(56) References Cited

FOREIGN PATENT DOCUMENTS

| | | |
|---|---|---|
| FR | 2801994 | 1/2002 |
| JP | 2000337917 | 12/2000 |
| JP | 2003058989 | 2/2003 |
| JP | 2004312376 | 11/2004 |
| JP | 2005163522 | 6/2005 |
| JP | 2005277632 | 10/2005 |
| JP | 2007331725 | 12/2007 |
| JP | 2008189261 | 8/2008 |
| JP | 2011154420 | 8/2011 |
| JP | 2011228841 | 11/2011 |
| KR | 20070017860 | 2/2007 |
| WO | 0161604 | 8/2001 |
| WO | 2014052329 | 4/2014 |
| WO | 2017217936 | 12/2017 |
| WO | 2019204144 | 10/2019 |
| WO | 2019204145 | 10/2019 |

OTHER PUBLICATIONS

European Search Report and Opinion dated Jun. 1, 2016 for EP Application No. 13842184.
Examination Report No. 1 for AU Application No. 2013323782 dated Oct. 12, 2018.
International Preliminary Report on Patentability and Written Opinion dated Feb. 3, 2014 for PCT Application No. US2013/061465.
International Search Report and Written Opinion dated Feb. 3, 2014 for PCT Application No. US2013/061465.
Notice of Allowance dated Apr. 18, 2017 for U.S. Appl. No. 15/411,916.
Notice of Allowance dated Oct. 24, 2016 for U.S. Appl. No. 14/668,781.
Office Action dated Apr. 1, 2016 for U.S. Appl. No. 14/668,781.
Office Action dated Aug. 31, 2016 for U.S. Appl. No. 14/668,781.
Scoot Networks (Demo Pit)—Launch Festival 2012 Presentation. LaunchConf. Scoot Networks. Published Mar. 14, 2012. https://www.youtube.com/watch?v=p5BlyBeTgzE.
U.S. Appl. No. 15/653,275 Notice of Allowance dated May 18, 2018.
U.S. Appl. No. 15/653,275 Office Action dated Jan. 12, 2018.
YouTube video titled Electric Scooter Sharing Service Makes Its Way to DC, available at https://www.youtube.com/watch?v=Kyoo8afD5hE, published on Mar. 1, 2018.
"Ellipse Smart Bike Lock—Keyless, Theft Alert, Solar-Powered and More" https://www.youtube.com/watch?v=y2VwDoAXAak (Year: 2016).
A Lock That Tells You When Someone Tries to Steal Your Bike "https://www.outsideonline.com/outdoor-gear/bikes-and-biking/lock-pings-your-phone-if-someone-tries-steal-your-bike/" (Year: 2017).
Jber "5 quick tips for a smoother airport ride" https://www.uber.com/en-TW/blog/5-quick-tips-smoother-airport-ride/ (Year: 2018).

\* cited by examiner

FIG. 10A  FIG. 10B

REMOTELY CONTROLLING USE OF AN ON-DEMAND ELECTRIC VEHICLE

CROSS REFERENCE TO OTHER APPLICATIONS

This application is a continuation of U.S. patent application Ser. No. 16/382,732 entitled REMOTELY CONTROLLING USE OF AN ON-DEMAND ELECTRIC VEHICLE filed Apr. 12, 2019 which is incorporated herein by reference for all purposes, which claims priority to U.S. Provisional Patent Application No. 62/660,857 entitled REMOTELY CONTROLLING USE OF AN ON-DEMAND ELECTRIC VEHICLE filed Apr. 20, 2018 which is incorporated herein by reference for all purposes, and claims priority to U.S. Provisional Patent Application No. 62/671,840 entitled REMOTELY LOCKING AND UNLOCKING AN ON-DEMAND ELECTRIC VEHICLE filed May 15, 2018 which is incorporated herein by reference for all purposes.

BACKGROUND OF THE INVENTION

On-demand vehicle-sharing provides consumers with the ability to rent vehicles instantly through a mobile device. Traditionally, human-powered vehicles such as bicycles have been the primary vehicle of choice for these vehicle-sharing programs. However, consumers may want to have access to shared use of electric vehicles as well.

Fixed docking stations with vehicle charging capabilities could in theory be used to charge electric vehicles when not in use. However, docking stations are not ideal for vehicle-sharing models as they drastically restrict the number of locations users can pick up vehicles from, and special docking station and/or vehicle equipment, such as chargers, connectors, and power sources, would be required and could provide a disincentive to use, especially if the docking or undocking were made less convenient or more difficult for the user.

Fixed docking stations have been used to lock or unlock vehicles for use. Use of electric vehicles made available to use on demand other than from a docking station must be controlled in a manner that enables the vehicle to be made available for use by an authorized user while preventing use by an unauthorized user.

BRIEF DESCRIPTION OF THE DRAWINGS

Various embodiments of the invention are disclosed in the following detailed description and the accompanying drawings.

FIG. 10A is a block diagram illustrating an embodiment of a system to lock and unlock an on demand electric vehicle based on over-the-air communications.

FIG. 10B is a block diagram illustrating an embodiment of a system to lock and unlock an on demand electric vehicle based on over-the-air communications.

DETAILED DESCRIPTION

Figure 1A:
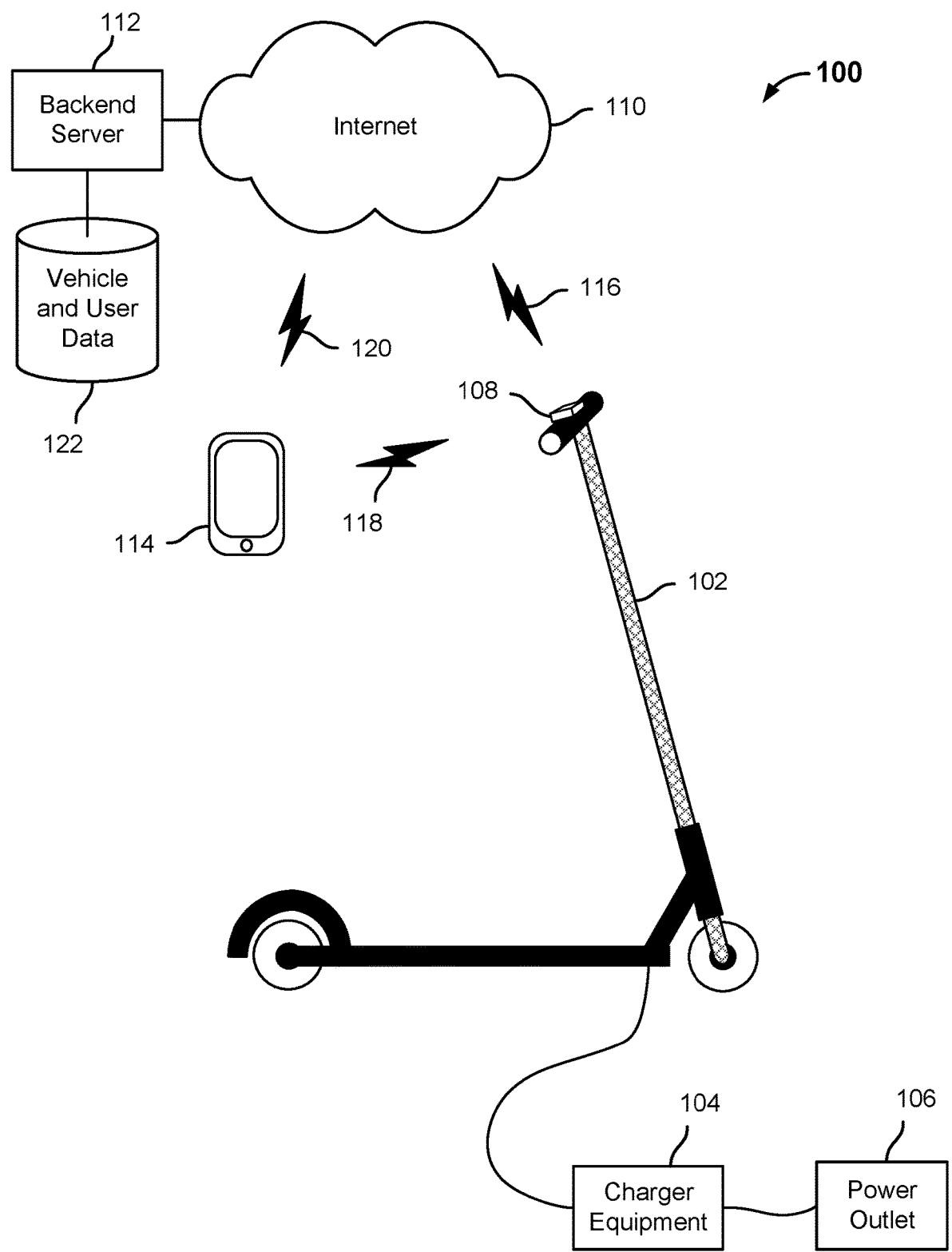
FIG. 1A is a block diagram illustrating aspects of an embodiment of a system to rent electric vehicles for use "on demand".

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to remotely communicate with and control various aspects of an on-demand electric vehicle. In various embodiments, an "on-demand" electric vehicle is one available to be rented, as opposed to a vehicle owned by the user. In various embodiments, vehicles equipped with a remotely-controllable braking system and/or other mechanisms to facilitate and/or prevent, deter, make difficult, and/or otherwise discourage vehicle movement, are provide. The vehicles are capable of communicating with the internet or an internet-connected device, e.g., directly or via one or more intermediate devices. A remote device or devices with a user-interface to control the vehicle wirelessly, as well as a series of functions to control the vehicle without requiring human intervention, is/are provided.

In various embodiments, the vehicle's braking system can use any physical, electronic, or other mechanism that entirely prevents or hinders the vehicle's wheels from moving the vehicle.

In various embodiments, aspects of the vehicle that may need be controlled herein include without limitation any type of: lights, speakers, wheels, steering apparatuses, brakes, motors, power systems, or any other system or component that is part of an electric vehicle system.

In various embodiments, the vehicle is configured to connect to the internet to fulfill communication and/or vehicle control requirements, including by one or more of:
  Communicating the GPS location of the vehicle to a cloud server that can relay information remotely
  Communicating the state of the vehicle (charged, uncharged, needs repair, in transit-to-market, etc)
  Geo-fencing the vehicle to prevent moving out of operational boundaries
  Locking wheels (and/or the electric motor) to prevent theft or unauthorized (e.g., unpaid) use
  Unlocking wheels to assist users in moving the vehicle
  Upgrading software, firmware, or other types of updates to the vehicle that can be performed via the internet In various embodiments, connection to the internet is not limited to cellular-dependent communication. For example, Short Message Service (SMS) protocol is used in some embodiments to send commands to and from the vehicle. In the event an SMS is used, extra work may be required to implement safety and security features such as secure communication and encrypted message content.

In various embodiments, Bluetooth, Wi-Fi, cellular, or other types of Radio Frequency hardware may be integrated directly with the vehicle and its sensors or be a completely separate system from the vehicle itself, e.g., a physical module or device mounted on the vehicle.

In some embodiments, a vehicle may communicate with a remote server via an intermediary device. For example, the vehicle may communicate via Bluetooth or other near field communication with a mobile device or other Internet-connected device. In some embodiments, vehicles may form a mesh or other peer-to-peer network, enabling vehicles lacking direct connectivity to the Internet to communicate with a server indirectly, via one or more other vehicles in the peer-to-peer network.

In various embodiments, control signals or commands may be sent to vehicles from a server, directly to the vehicle, or from a mobile device under control of one or both of a server and an instance of an associated mobile app running the mobile device.

In various embodiments, each of a plurality of electric vehicles comprising a fleet transmits its geo-location data to a cloud server. A mobile app that communicates and controls rudimentary functions of the vehicle is provided. Riders use the mobile app to find and ride vehicles.

In various embodiments, one or more of the following requirements are met to facilitate a fleet of on-demand rentals of electric vehicles.
  1. Vehicle-connectivity to the internet, e.g., direct connectivity from the vehicle to the internet and/or indirect connectivity through a user's mobile device;
  2. A user-interface that can communicate with the vehicles and control rudimentary aspects of the vehicles;
  3. A user-interface that can train users on crucial components of the system such as how to be safe with the vehicles, how to ride according to local regulations, etc., and
  4. A crowdsourced system to attract and incentivize people to "replenish" (i.e. charge, repair, etc.) the vehicles.

In various embodiments, a user-interface can take the form of a mobile application, a smartwatch application, a smart helmet or other wearable technology, or any other interface that communicates digital information to a user and has connectivity, directly or indirectly, to the internet.

In various embodiments, on-demand electric-vehicles are charged and/or otherwise serviced by a crowd-sourced group of independent contractors. In various embodiments, crowdsourced servicing incentives are determined and updated dynamically, via automated processes, and provided to crowdsourced service providers via automatic updates. In some embodiments, a portal for users to sign up to service vehicles is provided. A mobile app that displays vehicle geo-location and dynamically updated pricing or other incentive data is provided. Dynamically determined prices and other incentives to service vehicles are displayed to users, e.g., via the mobile app.

Examples of electric vehicles made available for on demand use as disclosed herein include without limitation electric scooters; electric bikes, minibikes, motor scooters, and motorcycles; skateboards, hover boards, and other single- or multi-wheeled electrically-powered boards; and self-balancing personal electric vehicles.

In various embodiments, the following terms (in bold) and associated meanings may be used to describe embodiments of a system to perform crowdsourced servicing of on-demand electric vehicles as disclosed herein:

Available State. Vehicles in the "Available" state satisfy all conditions for being rentable by a rider, in various embodiments. For example, in some embodiments, a vehicle is designated by the system as "Available" if the vehicle is in good repair and has sufficient charge to be rented, is in a location from which the vehicle is authorized to be rented, and has not been reported as lost, stolen, damaged, etc. In some embodiments, techniques disclosed herein are used to ensure that Available vehicles are not "captured" (e.g., taken out of service for charging, repairs, updates, etc.) by crowdsourced independent contractors. Within the "Available" state, in various embodiments, a given vehicle may be "In Use" by a rider (currently rented and ride not yet ended by the user) or "Free" (not currently rented and otherwise fulfilling the conditions to be "Available" for use).

Unavailable State. In various embodiments, vehicles in the "Unavailable" state violate at least one of the conditions that constitute an "Available" vehicle. In various embodiments, techniques disclosed herein are used to ensure that Unavailable vehicles cannot be rented by a rider.

Servicing State. In various embodiments, vehicles in the "Servicing" state are in the process of being serviced by a crowdsourced independent contractor. In various embodiments, techniques disclosed herein are used to ensure that vehicles in the Servicing State cannot be rented by a rider. In some embodiments, a vehicle in the Servicing State may also and/or instead be considered in a state associated with the particular service being provided, e.g., a "Charging State" for charging and a "Maintenance State" for repairs and/or other maintenance.

Charger. In various embodiments, a "charger" (or "Charger") is an independent contractor who captures, charges, and deploys vehicles. In various embodiments, they are paid based on the number of vehicles they successfully capture, charge, and/or deploy. In some embodiments, there may be multiple Chargers and/or other workers who contribute to fulfilling the Servicing State.

Mechanic. In various embodiments, a "mechanic" (or "Mechanic") is an independent contractor who captures, repairs and/or performs other maintenance on, and deploys vehicles. In various embodiments, they are paid based on the number of vehicles they successfully capture, service, and/or deploy. In some embodiments, there may be multiple Mechanics and/or other workers who contribute to fulfilling the Servicing State.

Replenisher. In various embodiments, a "replenisher" (or "Replenisher") is an independent contractor who captures, performs a service on or with respect to (e.g., charges, repairs, relocates), and/or deploys vehicles. A Replenisher may be a Charger, a Mechanic, or another crowd sources provider of a service or function with respect to on demand electric vehicles.

Capture. In various embodiments, Chargers "capture" vehicles while they are in the Unavailable state. Capture may include one or more of retrieving the vehicle from a location at which it was left by a rider, and taking the vehicle to a charging location or an intermediate location on its way to a charging location.

Hours of Operation. In various embodiments, "Hours of Operation" refer to the time period when vehicles can be rented by a rider.

Operational Boundaries. In various embodiments, "Operational Boundaries" refer to a pre-determined, closed boundary of location coordinates of where vehicles can be rented by a rider.

Deploy. In various embodiments, Chargers "deploy" vehicles once the vehicle is ready to be re-introduced into the Available fleet. Deploying may include delivering a charged vehicle to a location from which it may be rented.

Rider. In various embodiments, "Riders" are the consumers who rent vehicles.

A number of examples described below refer to vehicles being charged by chargers; however, in various embodiments, the same systems, processes, and interfaces are adapted to incentive Replenishers to perform other tasks, such as repair/maintenance and/or vehicle retrieval, delivery, deployment, and/or relocation services.

FIG. 1A is a block diagram illustrating aspects of an embodiment of a system to rent electric vehicles for use "on demand". In the example shown, the system 100 includes a plurality of electric vehicles available for use on demand, represented in FIG. 1A by electric scooter 102. Electric scooter 102 and other vehicles in the fleet are propelled by an electric motor (not shown) powered by a battery (not shown), e.g. a battery in the foot board and/or located elsewhere in scooter 102. The battery of scooter 102 is depleted through use. Charger equipment 104 plugged into a power outlet or other power source 106 is used to charge the battery of scooter 102.

In various embodiments, independent contractors referred to herein as "chargers", are recruited via a mobile app or other interface to charge vehicles comprising the fleet, such as scooter 102. Each vehicle is equipped with a circuit board 108 comprising a communication functionality, such as WiFi, Bluetooth, GPS, cellular, etc., enabling the vehicle to connect directly or indirectly (e.g., via a user's mobile device) via the Internet 110 to a backend server 112. The connection may be via direct wireless communication 116, if equipped, or indirect, e.g., via Bluetooth or other near field communication 118 to a user's mobile device 114 configured to relay information via communications 120 to the backend server 112 via the Internet 110. For example, a mobile device 114 carried by a user renting and/or riding the scooter 102, a mobile device 114 carried by a user who passes near the scooter 102 on the street, and/or a mobile device 114 of a user who has retrieved the scooter 102 to charge it may be used to receive vehicle state information from the scooter 102 and relay such information via the Internet 110 to backend server 112.

In various embodiments, vehicle state information including at least a battery charge level of scooter 102 and a location of scooter 102 may be reported from time to time and/or upon occurrence of certain events (e.g., state transitions, as described in connection with FIG. 1B) to backend server 112. Backend server 112 in various embodiments maintains current and/or historical vehicle state information in a vehicle and user data store 122, e.g., a database. Vehicle information stored in data store 122 may include without limitation a history of preventive maintenance, repairs, ride and/or other usage history and data, user and/or charger feedback about the vehicle and/or its condition, charge state, battery health, etc. User information stored in data store 122 may include without limitation records associated with users registered to ride vehicles comprising the fleet, such as scooter 102, and users registered to charge vehicles comprising the fleet in exchange for a payment and/or other consideration (e.g., ride credits, virtual currency, status or other recognition within a user community, etc.). User records for users who charge vehicles (sometimes referred to as "chargers") in various embodiments may include information indicating which vehicles are currently being charged (or reserved to be charged) by the user; financial account information; past, current, or expected payment information; charger performance metrics, such as percent on time redeployment, etc.; etc.

Figure 1B:
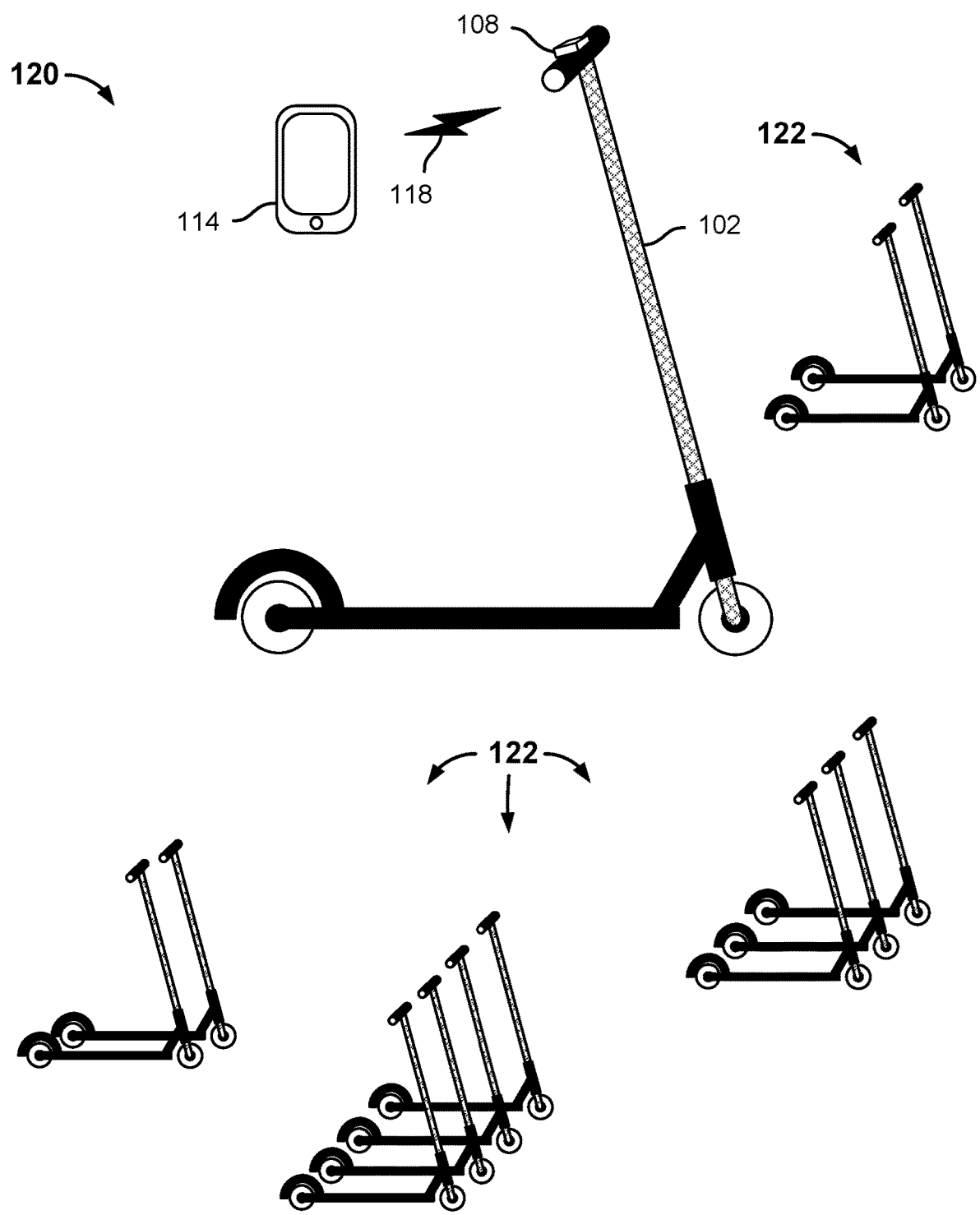
FIG. 1B is a block diagram illustrating an embodiment of a system to rent electric vehicles for use "on demand".

FIG. 1B is a block diagram illustrating an embodiment of a system to rent electric vehicles for use "on demand". In the example shown, electric scooter 102 of FIG. 1A is shown to be included in a fleet 120 of electric scooters including scooters 122 deployed throughout a geographic service area.

In various embodiments, each of the scooters 102, 122 is configured to report its geo-location and state information (e.g., charge, other status or health information, etc.) via the internet, either through direct communication by a transceiver built into the scooter 102, 122 or indirectly via near field communications 118 between the scooter 102, 122 and mobile devices that have the associated mobile app installed and running and come within near field communication range of such a mobile device, such as mobile device 114 in the example shown.

In various embodiments, a user of mobile device, such as mobile device 114, receives via an app on the mobile device 114 information to find, unlock, and ride a selected one of the scooters (or other vehicle) 102 122. The mobile app provides a map-based or other user interface to locate vehicles in an area of interest to the user. The corresponding locations are displayed on the map. For example, the default location may be a walkable radius from the geo-location of the mobile device. However, in some embodiments, the user may change the view, such as by zooming in or out, using a drag or other gesture to search for vehicles in another area, a search box to enter a search area or center, etc.

In various embodiments, the mobile app includes functionality to teach the user how to activate and ride the electric vehicle and to do so safely and while complying with local regulations. When a user is done riding, the user indicates the "end" of their ride. In some embodiments, the mobile app may provide general or location-specific instructions as to how and where to park the vehicle. The mobile app may prompt the user to take a photo of the vehicle as parked. In various embodiments, the photo may be stored (e.g., for a prescribed time) to be available for use in checking or verify the condition and placement of the vehicle as left by the user at the end of the user's ride. In some embodiments, machine learning and other techniques are used to detect via automated processing, based on an image of the vehicle as parked, whether the vehicle was parked properly or not.

Figure 1C:
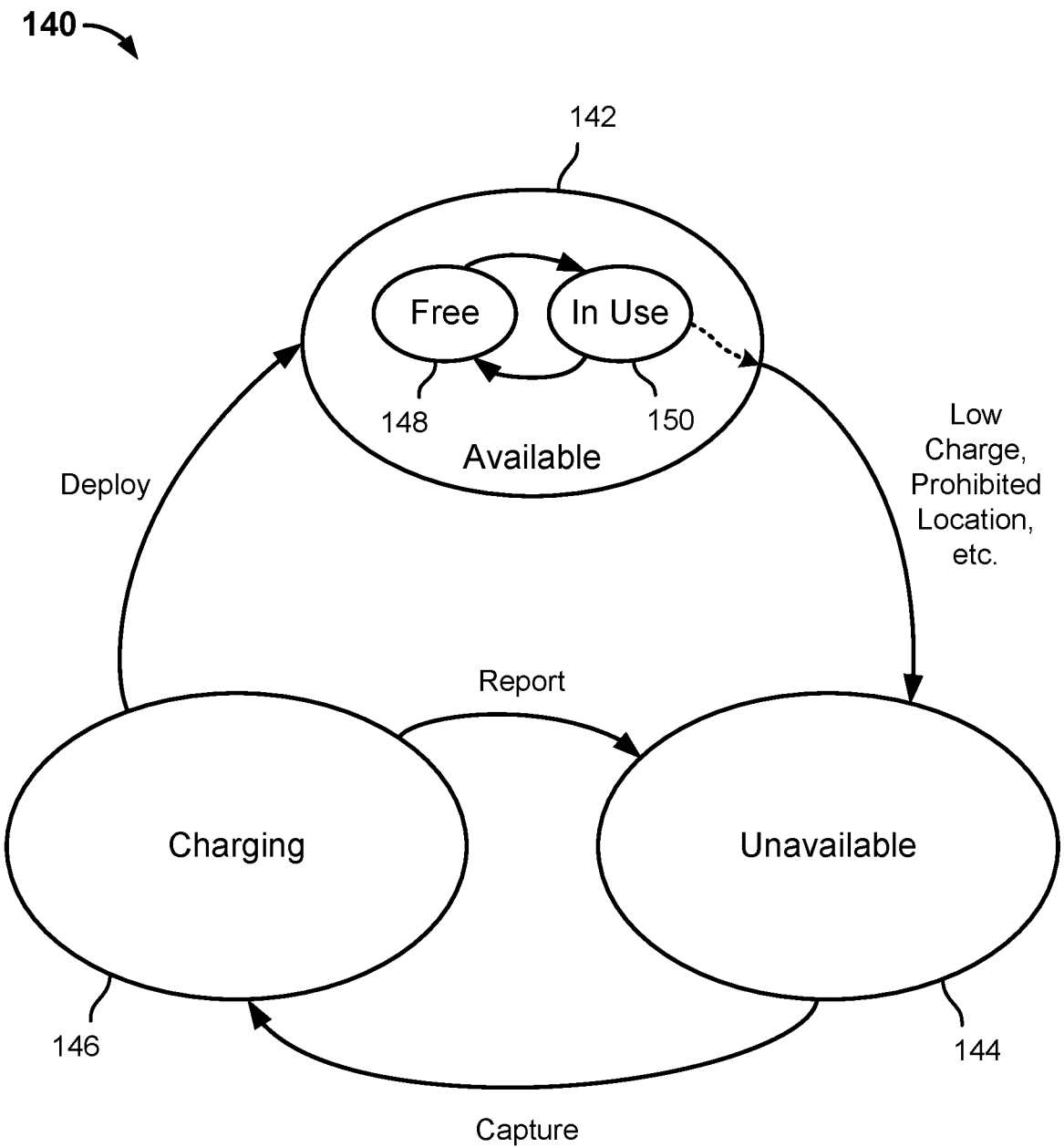
FIG. 1C is a state diagram illustrating states in which each on demand electric vehicle comprising a fleet may be, and transitions between such states, in an embodiment of a system to perform crowdsourced charging of on-demand electric vehicles.

FIG. 1C is a state diagram illustrating states in which each on demand electric vehicle comprising a fleet may be, and transitions between such states, in an embodiment of a system to perform crowdsourced charging of on-demand electric vehicles.

In the example shown, state machine 140 includes Available State 142. In various embodiments, a vehicle in the Available State 142 is available to be rented by a rider. For example, a vehicle that is fully or adequately charged and in a permitted location (e.g., within applicable Operational Boundaries) during a time in which use is permitted (e.g., within applicable Hours of Operation) may be in the Available State 142. In various embodiments, vehicle in the Available State 142 is visible in a mobile user interface available to riders and may be claimed/reserved for use via the mobile user interface. In some embodiments, state information indicating a vehicle is in the Available State 142 is stored in a backend database, such as vehicle and user data store 122 of FIG. 1A. Vehicle state information (e.g., location, charge level, etc.) reported periodically (on occurrence of a triggering event, opportunistically, etc.) to a backend server, such as backend server 112, is used in various embodiments to determine whether a vehicle is in the Available State 142 and to store in the backend database data representing the state. In some embodiments, a vehicle in the Available State 142 is not subject to being captured by a charger.

In various embodiments, the vehicle constantly monitors itself and its surroundings to determine if it is in violation of any conditions of being in the Available State 142. A non-exhaustive list of primary conditions that qualify a vehicle to be and/or remain in the Available State 142 in various embodiments includes one or more of:

1. The vehicle's battery levels are sufficiently charged given current time, location, and other contextual factors
2. The vehicle's geo-location is inside the operational boundaries
3. The current time-of-day is inside the hours of operation In some embodiments, one or more other conditions that relate to the vehicle operating status, weather conditions, or other factors, must be satisfied for a vehicle to be considered to be in the Available State 142.

In some embodiments, the threshold for what constitutes as "sufficiently charged" to remain in the Available State 142 may change dynamically throughout the day or in response to other factors. For example, during later operational hours, vehicles with higher battery levels may be considered unavailable even though the same vehicle with equivalent battery levels may not have been considered unavailable earlier in the day.

Within the Available State 142, a vehicle may be in a subsidiary "Free" state 148, indicating the vehicle is not currently in use by a rider, or in an "In Use" state 150, if the vehicle satisfies the conditions of the Available State 142 (sufficient charge, etc.) but is currently in use by a rider. In various embodiments, vehicles in the Available State 142 that are currently in the subsidiary "Free" State 148 are included in a pool of vehicles considered by the system to be available for use. Vehicles in the Free State 148 within Available State 142 are included and represented in rider-facing mobile app and/or other user interfaces, in various embodiments, as available to be rented.

In various embodiments, the Available State 142 begins when the vehicle is deployed and ends when the vehicle enters the Unavailable State 144. In various embodiments, the Unavailable State 144 begins when a vehicle becomes Unavailable and ends when a charger captures the vehicle.

In various embodiments, upon entering the Unavailable State 144, one or both of the following changes take place in the system: (1) the vehicle no longer appears on the rider user-interface map, and as a result the vehicle can no longer be rented by a rider; and/or (2) the vehicle appears on the charger user-interface map, and as a result, the vehicle can now be captured by chargers.

In the example shown, a dotted arrow from the "In Use" state 150 within the Available State 142 represents an edge case in which a vehicle transitions directly from being in the "In Use" state 150 to be Unavailable State 144, e.g., the user rides the vehicle so long that the battery depletes fully and/or to a level below a minimum threshold to remain in the Available State 142.

In various embodiments, a vehicle in the Unavailable State 144 may be "captured" by a "charger" willing to charge the vehicle for a fee or other consideration. In the example shown in FIG. 1B, a vehicle in the Unavailable State 144 that is captured for charging enters the Charging State 146. In some embodiments, a vehicle is captured for charging by selecting the vehicle in a charger-facing user interface and selecting an option to capture the vehicle for charging. Capture results in the backend database record for the vehicle being updated to indicate it has been captured by the charger, and the user record of the charger being updated to reflect that the vehicle has been captured by the charger.

In the Charging State 146, a charger who has captured the vehicle receives via a charger-facing user interface information indicating where the vehicle is believed to be located. The charger retrieves the vehicle, if it can be located, and charges it using equipment such as charger equipment 104 in the example shown in FIG. 1A. If the vehicle cannot be located by the charger, or is damaged, the charger may submit a report, returning the vehicle to the Unavailable State 144, and in some embodiments triggering responsive action based on the report, such as deploying maintenance or other personnel (e.g., other independent contractors) to locate and/or repair the vehicle.

In various embodiments, the charge state of the vehicle is updated (e.g., continuously, periodically, upon being charged to one or more threshold levels, etc.) and the associated vehicle record is updated to reflect that charge state. Once the vehicle has been charged, the charger deploys the vehicle to a deployment location and the vehicle reenters the Available State 142. In some embodiments, the charger deploys the charged vehicle to a specific location, such as a deployment location reserved by the charger for the purpose. For example, the deployment location may be reserved (e.g., for a time) by the user via a charger-facing user interface. In some embodiments, the charger may be directed to deploy the vehicle to a location associated with a rider and/or a reservation to ride the vehicle.

In some embodiments, different individuals may fulfill different actions during the Charging State, such as capturing, charging, and deploying the vehicle. For example, the Charger who captured the vehicle may not be the same person who physically charges nor deploys the vehicle.

Once the charged vehicle has been deployed and reentered the Available State 142, a transaction is processed to credit (pay) the charger for charging the vehicle.

In various embodiments, the amount that a charger will be paid for charging and/or releasing a vehicle is adjusted in various embodiments based on one or more of:

1. The amount that the vehicle has been charged relative to the battery levels at the time of capturing the vehicle
2. The location of where the vehicle is deployed
3. The time when the vehicle is deployed
4. The number of vehicles in a given area and time
5. The number of riders in a given area and time In various other embodiments, one or more other conditions may be considered, such as vehicle operating status, weather conditions, and other factors, that are taken into account when calculating pricing.

In some embodiments in which different individuals may be fulfilling different actions during the Charging State 146, the act of paying each specific charger may take place after each action is fulfilled. For instance, in some embodiments, charger 1 can be paid after capturing the vehicle, charger 2 can be paid after charging the vehicle, and charger 3 can be paid after releasing the vehicle. In other embodiments, the entire Charging State 146 must be completed before paying the charger.

In some embodiments, vehicle maintenance and/or updates may be performed on a vehicle while the vehicle is in a Charging State 146. For example, firmware and/or other software updates and/or configuration updates may be pushed to the vehicle, e.g., via the Charger's mobile device, Wi-Fi, etc. In some embodiments, an additional incentive may be provided to a Charger to perform repairs, tune-ups, maintenance inspections, cosmetic repairs, etc. while a vehicle is in the Charging State 146.

In various embodiments, upon successful deployment of the vehicle after charging, the vehicle enters the Available State 142 and the entire process may be repeated.

Figure 2A:
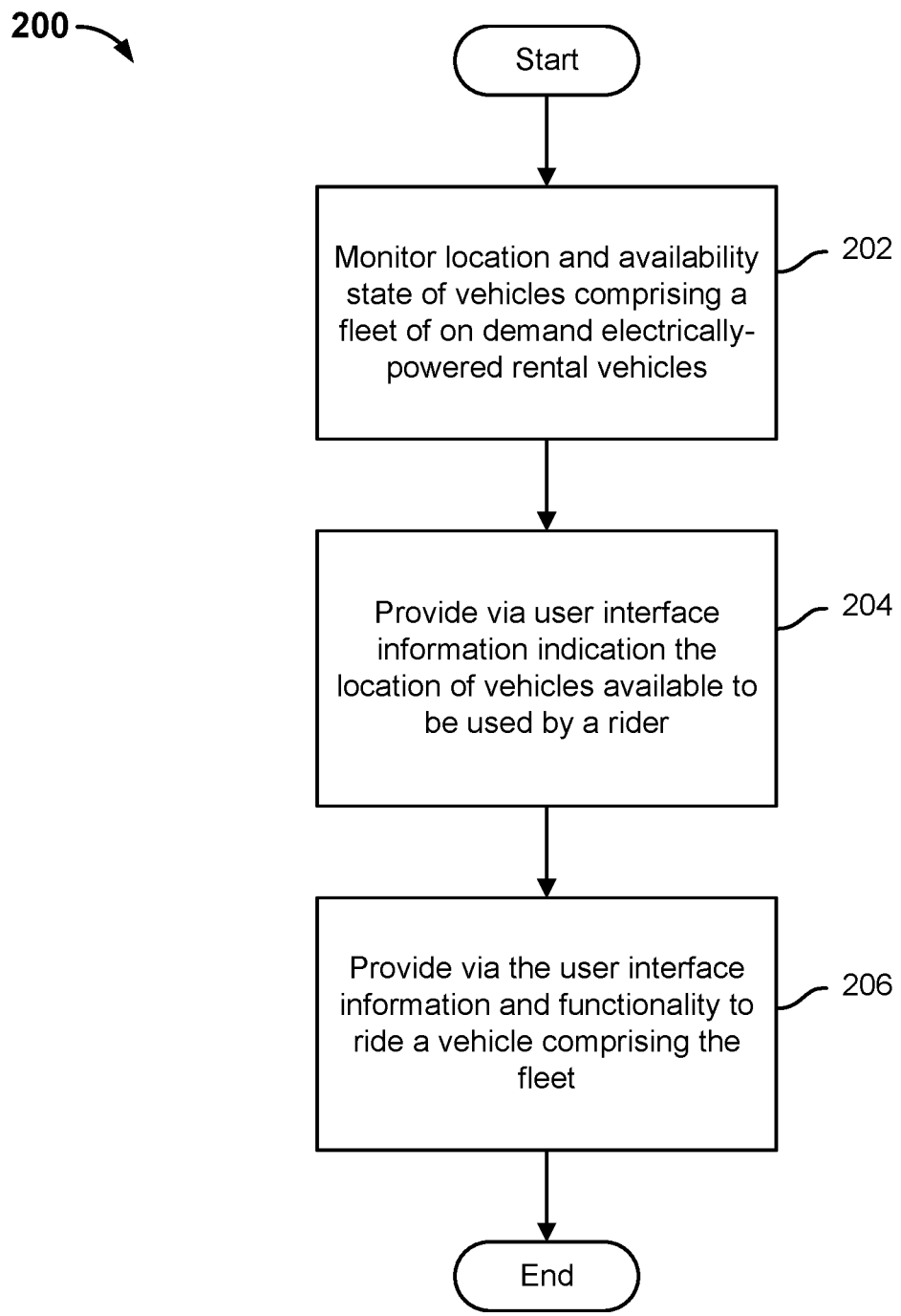
FIG. 2A is a flow chart illustrating an embodiment of a process to provide the ability to rent electric vehicles rental on demand.

FIG. 2A is a flow chart illustrating an embodiment of a process to provide the ability to rent electric vehicles rental on demand. In various embodiments, the process 200 of FIG. 2 is implemented, in whole or in part, by a backend server, such as backend server 112 of FIG. 1A. In some embodiments, all or part of the process 200 may be implemented by instances of a mobile app, each instance running on a mobile device associated with a crowdsourced independent contractor who participates and/or is registered to participate in charging on demand electric vehicles for payment or other consideration.

In the example shown, the geographic location and availability state (e.g., battery charge level, reported as damaged or not, etc.) of vehicles comprising a fleet of on demand electric vehicles is monitored (202). For example, each vehicle may report its location, battery charge level, etc., directly or indirectly, as described above in connection with FIG. 1A.

The location and availability state information is used to provide, e.g., via a mobile user interface, information indicating the location and (optionally) charge level of electric vehicles currently available to be used by a rider (204). For example, each prospective rider may access a map-based mobile user interface to locate an available (and currently free) vehicle in an area of interest to the user. Each vehicle or clump of vehicles may be marked by a pin, icon, or other marker. Hovering on or selecting a given specific vehicle may result in charge level and/or other information being displayed. Vehicle numbers or other identifiers and/or additional information may be displayed, e.g., when the vehicle was last rented and/or used, when the location was last reported, etc.

Information and functionality to unlock, ride, and make payment for riding a vehicle is provided via the mobile or other user interface (206). For example, in some embodiments a user may claim/reserve (e.g., for a limited time) a vehicle to be used by that user. In various embodiments, training on how to ride the vehicle, how to ride safely, local regulations, etc. may be provided via the mobile app.

In various embodiments, a user uses the app to find and select a vehicle to ride. The user is prompted to provide required input, such as to take images of the front and/or back and/or bar codes or other encoded or specific information on the user's driver's license, where required, and/or to read and electronically sign or otherwise acknowledge the provider's terms of service. Additional examples of functionality provided to facilitate vehicle rental include, without limitation, the ability to scan a QRC or other encoded identifier on a structure comprising or mounted on the vehicle.

In various embodiments, a backend server, such as server 112 of FIG. 1A, is configured to receive information from each of a plurality of mobile app instances, each associated with a corresponding device and/or user. The server processes information received from the mobile app instances to enable a rider to ride a specific vehicle. In some embodiments, the server receives an identification of a specific vehicle in the form of a photo of a QRC or other code visible on the specific vehicle. The server verifies the availability state of the vehicle (e.g., not already reserved or rented by another user, sufficient battery charge level, etc.) and if available associates the vehicle with the requesting user for use. In various embodiments, the server unlocks the vehicle for use by the user, e.g., by sending an unlock command directly to the vehicle, if direct communication is available, or through the mobile app instance associated with the request.

In various embodiments, while a vehicle is in use by a rider the rider's mobile device and app may perform ongoing monitoring of the vehicle and the ride. For example, and without limitation, one or more of the following may be monitored and reported to the backend server via the mobile app and device: vehicle charge level; vehicle speed; vehicle location; etc.

Figure 2B:
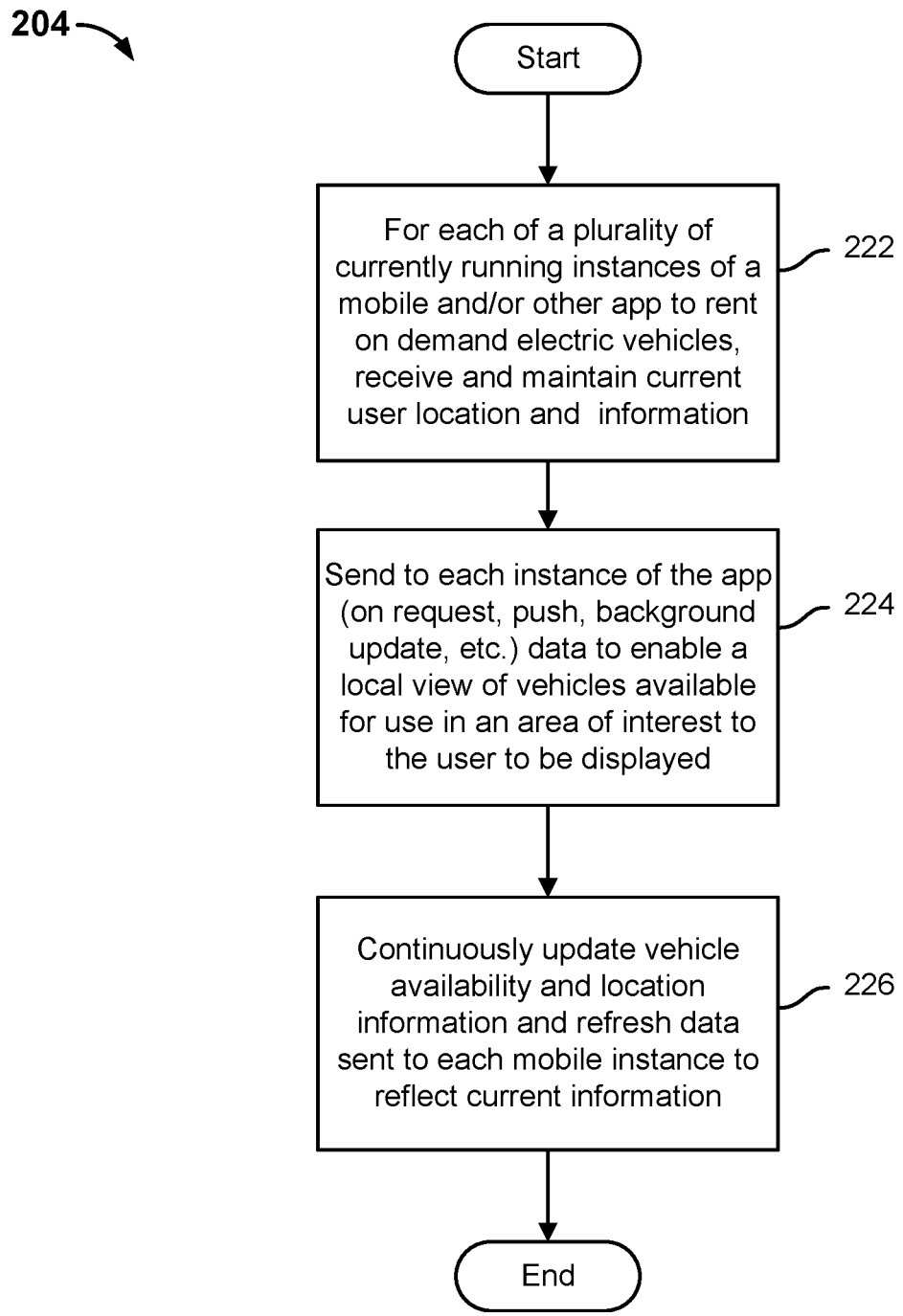
FIG. 2B is a flow chart illustrating an embodiment of a process to provide via a user interface information to enable a user to find electric vehicles available for rental on demand.

FIG. 2B is a flow chart illustrating an embodiment of a process to provide via a user interface information to enable a user to find electric vehicles available for rental on demand. In various embodiments, the process of FIG. 2B is used to implement step 204 of FIG. 2A. In various embodiments, the process of FIG. 2B is implemented, in whole or in part, by a backend server, such as backend server 112 of FIG. 1A. In some embodiments, all or part of the process of FIG. 2B may be implemented, in whole or in part, by instances of a mobile app, each instance running on a mobile device associated with a user registered to rent on demand electric vehicles for use.

In the example shown, current user location and information is received and maintained for each of a plurality of currently running instances of a mobile and/or other app to rent on demand electric vehicles (222). Data to enable a local view of vehicles available for use in an area of interest to the user is sent to respective instances of the app, to be displayed to the respective users (e.g., if/as requested by the user) (224). In various embodiments, vehicle data may be sent to user app instances on request (user opens app, user selects a control to "find" vehicles, etc.) and/or may be pushed proactively to the app, sent to the app when configured to run in the background, etc. Vehicle availability and location information is updated continuously, and refreshed data is sent to each mobile instance to reflect current information (226). In this way, an accurate and dynamically updated view of those vehicles that remain nearby and currently available (free) to be rented is maintained and provided to each user.

Figure 2C:
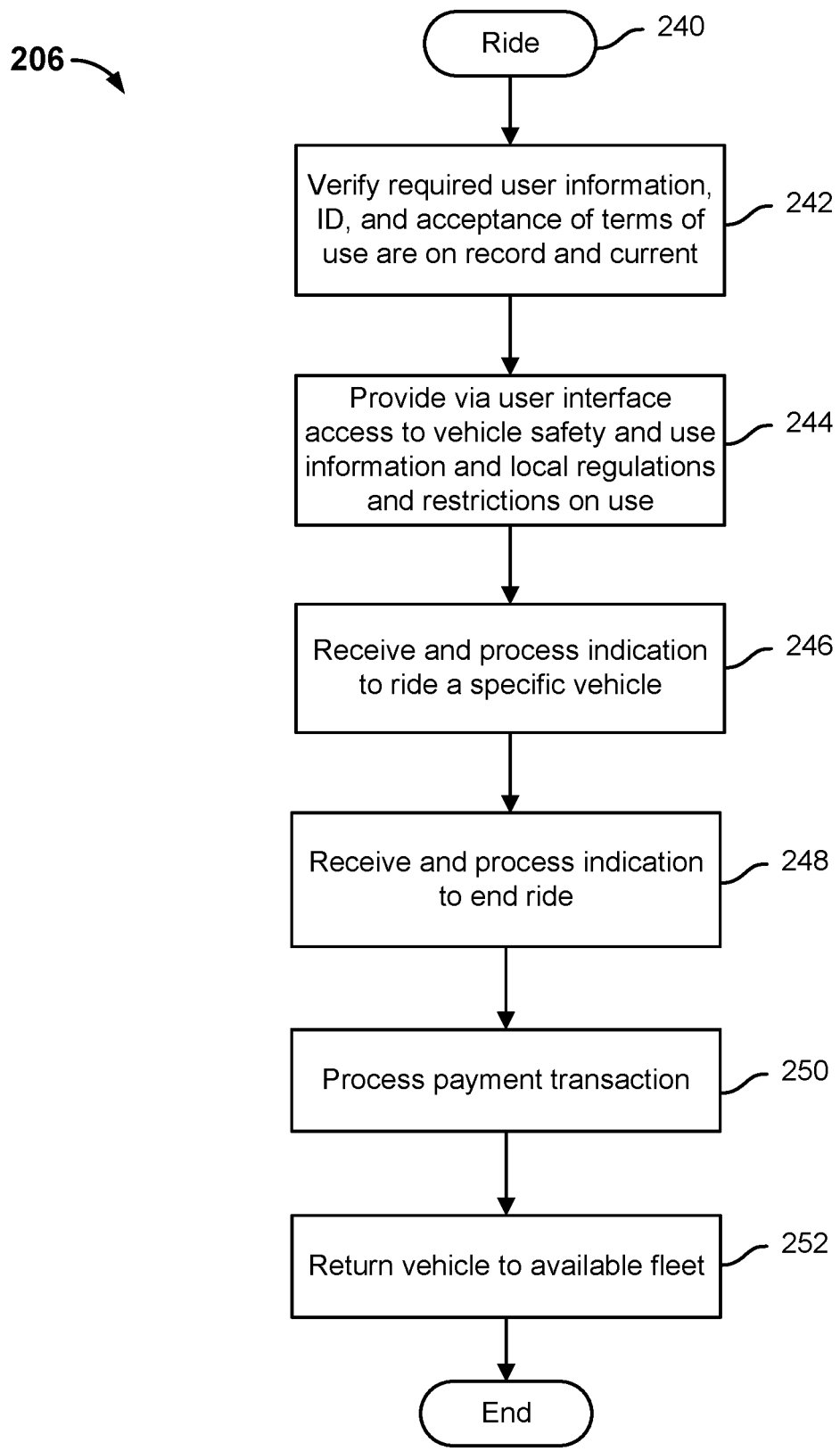
FIG. 2C is a flow chart illustrating an embodiment of a process to provide via a user interface information and functionality to use an electric vehicle available for rental.

FIG. 2C is a flow chart illustrating an embodiment of a process to provide via a user interface information and functionality to use an electric vehicle available for rental. In various embodiments, the process of FIG. 2C is used to implement step 206 of FIG. 2A. In various embodiments, the process of FIG. 2C is implemented, in whole or in part, by a backend server, such as backend server 112 of FIG. 1A. In some embodiments, all or part of the process of FIG. 2C may be implemented, in whole or in part, by instances of a mobile app, each instance running on a mobile device associated with a user registered to rent on demand electric vehicles for use.

In the example shown, upon receiving an indication from a user to ride a vehicle (240), e.g., the user selects a "ride" control in a mobile app or other user interface, verification processing is performed to ensure all user prerequisites to ride have been met (242). For example, in some embodiments, a user may be required to fulfill one or more of the following requirements, if not already met: scan driver's license or other credential; read and indicated electronically acceptance of the provider's terms of use; read and/or acknowledge local regulations and/or safety information; complete app-based tutorial; sufficient funds balance in the user's account; valid credit card on file; etc. Access to vehicle safety and use information, local regulations, etc., is provided via the mobile app (244).

An indication to ride a specific vehicle is received (246). For example, the QRC or other code on a vehicle may have been scanned using the mobile app and device. In various embodiments, in response receiving an indication to ride a specific vehicle the backend server/service marks the vehicle as "in use" and associates the vehicle with the user and/or app instance. In addition, in embodiments in which use is charged based at least in part on ride duration, one or both of the server/service and the app starts a timer.

In some embodiments, a user may be prompted to take a "selfie" or other photo using the mobile app and/or device, e.g., to verify identity and/or to determine by machine learning or other automated processing that the user is wearing helmet or other safety equipment. In some embodiments, an image to verify the user is wearing a helmet may be required in some locations but not others. For example, the image may be required only in areas in which a local jurisdiction requires riders to wear a helmet and/or for providers to verify helmet use.

An indication that the user has ended the user's ride is received (248). In various embodiments, the indication may be received in response to the user selecting a control to "end" the ride. In some embodiments, an indication the ride has ended may be received if the user has not selected the "end" control but the vehicle has not moved for a prescribed amount of time, the user's location (as reported by the mobile app and/or device) has deviated from the location of the vehicle, etc. In some embodiments, if the vehicle has not moved for a prescribed time and/or the user moves more than a threshold distance away from the vehicle, then the mobile app provides a visual and/or audible alert to prompt the user to indicate whether the ride has ended, e.g., "Have you finished your ride?" In various embodiments, the ride duration timer (at server and/or mobile app) is stopped in response to receiving the indication the ride has ended (248).

A transaction to charge the rider for use of the vehicle is processed (250). For example, a credit balance in the user's account may be debited by an amount to be charged for the ride. In some embodiments, rides are charged for on a basis other than ride duration. In various embodiments, prices charged by time or otherwise may be adjusted dynamically, for example in response to fluctuations in demand and/or vehicle availability relative to demand or expected demand in a given area, at a given time of day, etc.

In various embodiments described herein a user interacts with one or both of a service to provide electric vehicles for on demand rental and the vehicles themselves using a mobile app running on a mobile device of the user (e.g., phone, watch, other wearable tech). In various embodiments, techniques disclosed herein may be used without using a mobile app or device. For example, in some embodiments, electric vehicles comprise equipment to interact with riders and to communicate location and state information to a backend server other than via a mobile device. In some embodiments, biometric (face recognition, voice recognition) or other identification processing is performed using image or audio captured by the vehicle itself. A user simply states the user's name (e.g., actual name, user name within the service, etc.) and indicates the user desires and intends to ride a specific vehicle. The vehicle captures and provides to the service biometric (image, audio, etc.) or other information, and upon verification by the server is unlocked by the server and made available for use by the user.

Figure 3A:
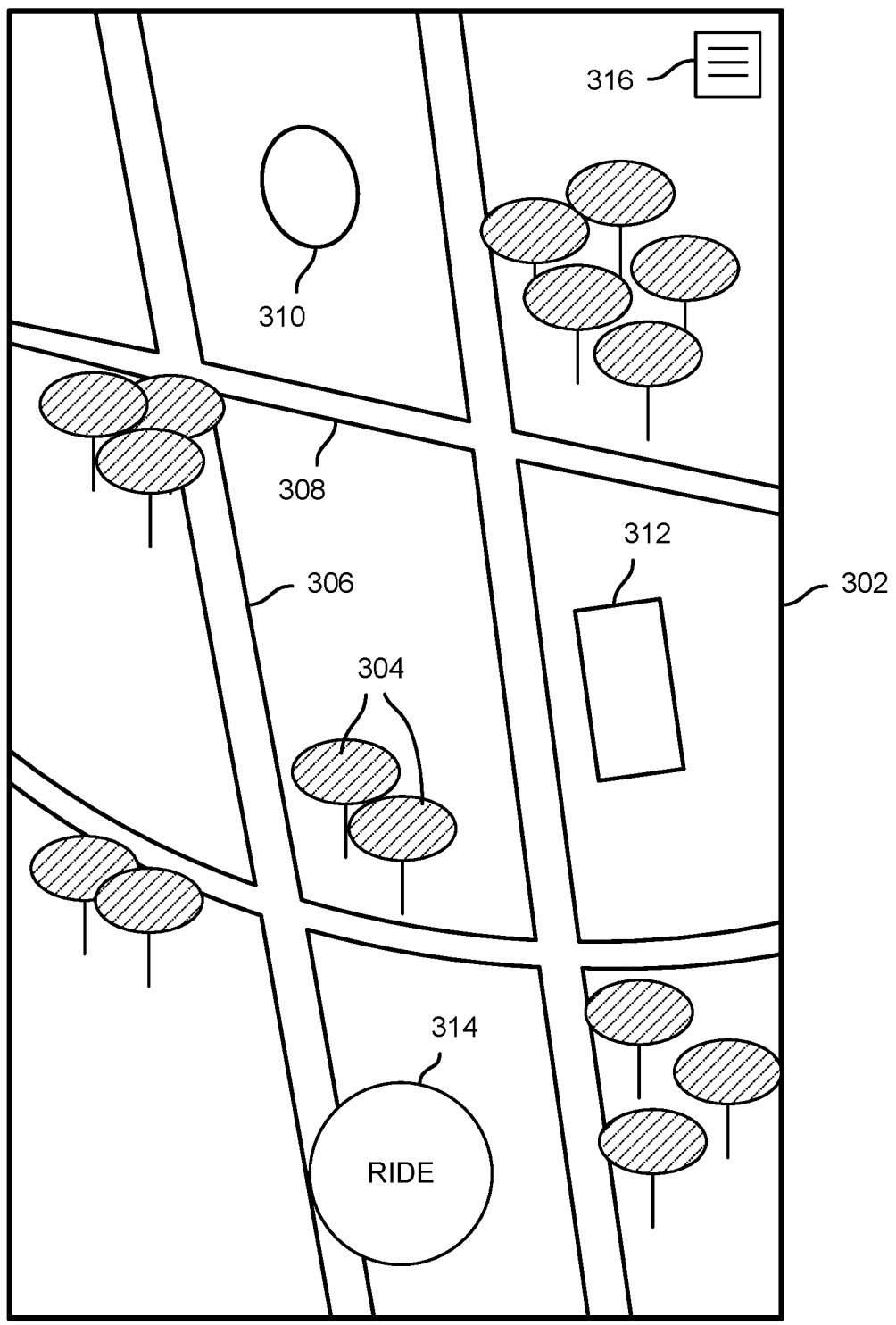
FIG. 3A is a diagram illustrating an embodiment of a user interface to locate and rent on-demand electric vehicles.

FIG. 3A is a diagram illustrating an embodiment of a user interface to locate and rent on-demand electric vehicles. In various embodiments, the user interface 302 of FIG. 3 is displayed on a mobile device via a mobile app running on the device using data received from a backend server, such as backend server 112 of FIG. 1A. In the example shown, user interface 302 comprises a map-based display in which electric vehicles (e.g., scooters) available to be rented and used are represented by location pin-style icons 304. Each instance of icon 304 may represent one or more vehicles at the indicated location, in various embodiments. In some embodiments, a two-finger squeeze gesture may be used to zoom out and moving two fingers further apart zooms in. In some embodiments, depending on the map scale and number of scooters in each location each icon 304 may represent one or more than one vehicle. As a user zooms in, for example, a group of vehicles represented by a single icon 304 may be disaggregated and each vehicle may come to instead be represented individually, e.g., each by an instance of icon 304.

In the example shown, vehicles are shown (icons 304) in locations relative to streets and/or pathways 306, 308 and landmarks 310, 312, such as buildings, fountains, parks, etc. A ride button 314 may be used to rent a vehicle for use. In some embodiments, a vehicle may be selected in user interface 302 and the ride button 314 selected to reserve the vehicle for use. In some embodiments, selection of the ride button 314 accesses a mobile device camera-based interface via which the user is prompted to use the mobile device to scan a QRC code, bar code, or other information physically displayed on a vehicle to rent the vehicle for use.

A vehicle rented for use in this manner in various embodiments results in the vehicle no longer appearing in corresponding instance of user interface 302 as displayed to other users. Additionally, the vehicle enters the "in use" state on the backend and records to track the user's usage of the vehicle (e.g., time, location, etc.) and to process a transaction to charge the user's credit card or other account for the ride are generated.

In the example shown, user interface 302 includes a menu/option button 316 in the upper right corner. In various embodiments, selection of menu/option button 316 results in a display page with additional controls, options, and/or information being displayed.

Figure 3B:
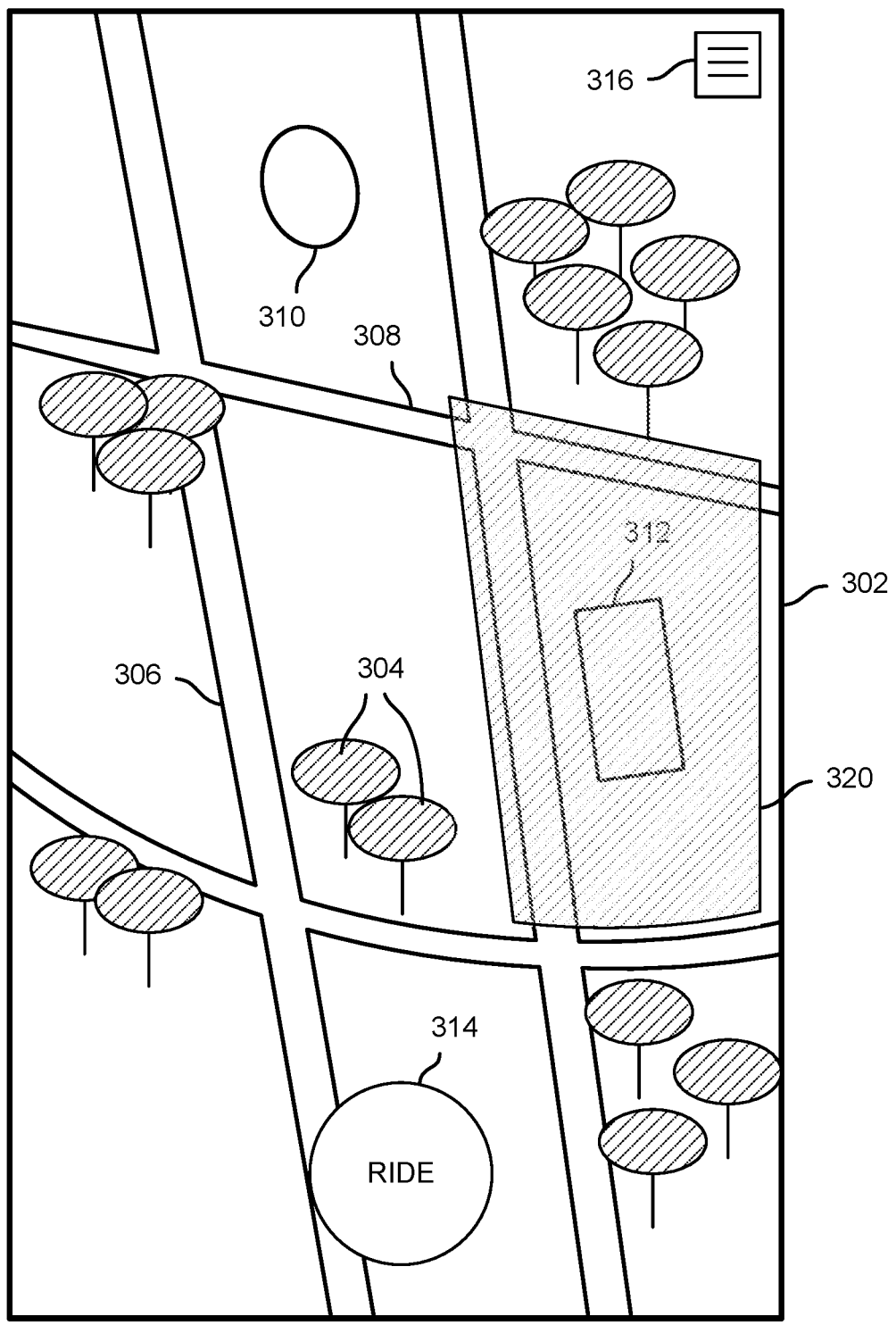
FIG. 3B is a diagram illustrating an embodiment of a user interface to locate and rent on-demand electric vehicles.

FIG. 3B is a diagram illustrating an embodiment of a user interface to locate and rent on-demand electric vehicles. In the example shown, the map-based interface 302 of FIG. 3A has been augmented by adding an overlay 320 indicating a region in which it is not (currently) permitted to ride and/or park a vehicle. In various embodiments, the overlay 320 may be static (e.g., city or other jurisdiction and/or designated portion thereof in which vehicle may not be ridden and/or parked at any time) or dynamic (e.g., building 312 is a school and vehicle may not be operated in the indicated area during school hours, or building 312 is an apartment building for retirees and vehicles may not be operated after dark, etc.). In various embodiments, overlay 320 is generated and displayed in response to user location and area of interest information received at a backend server. If the user is near or uses the map-based interface to explore an area subject to restrictions, a corresponding overlay 320 is generated and rendered as shown in FIG. 3B.

In various embodiments, the map-based interface of FIGS. 3A and 3B includes direction functionality to generate directions and a route to drive or walk from a user's current location to a selected location at which a vehicle indicated by the user is located.

Figure 4:
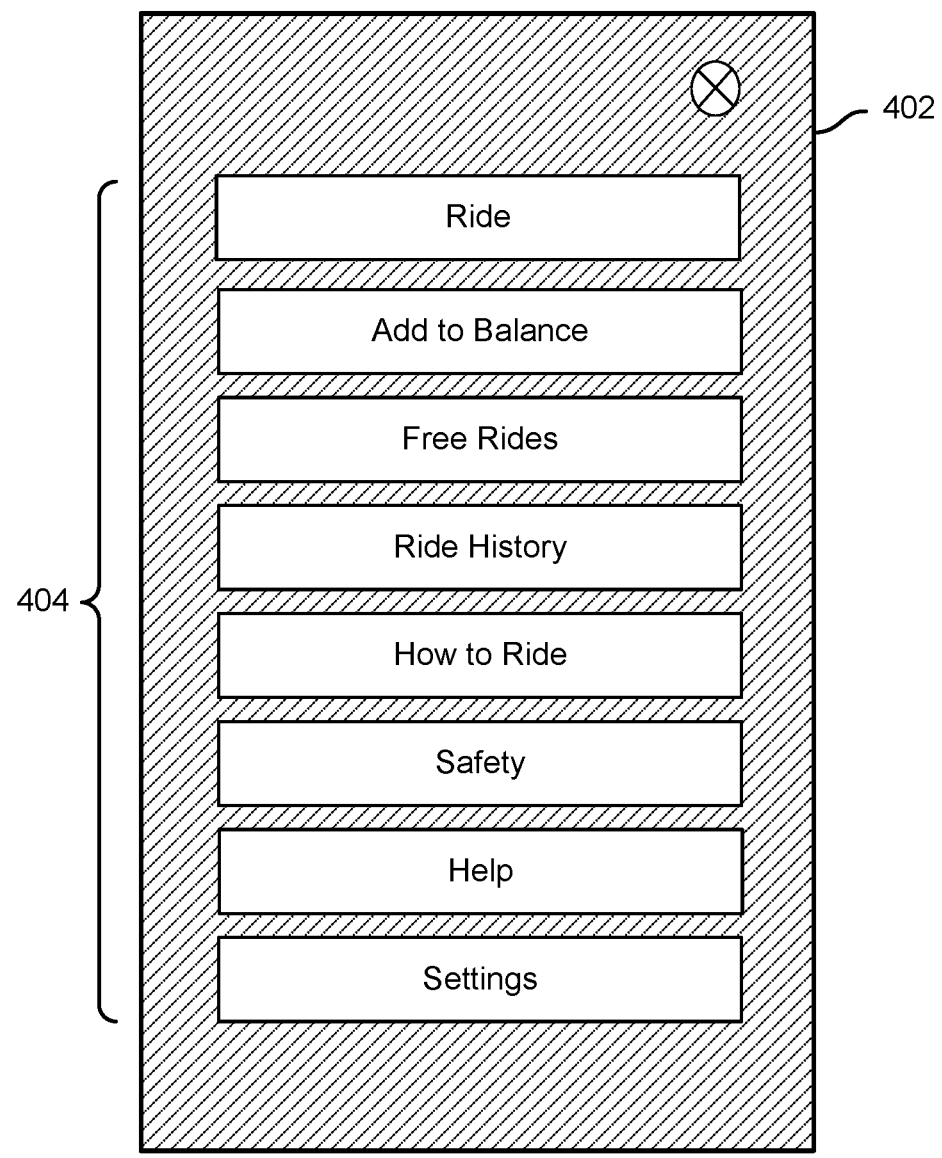
FIG. 4 is a diagram illustrating an embodiment of a user interface to rent an on-demand electric vehicle or charge on-demand electric vehicles.

FIG. 4 is a diagram illustrating an embodiment of a user interface to rent an on-demand electric vehicle or charge on-demand electric vehicles. In some embodiments, the options display page 402 of FIG. 4 is displayed upon selection of an additional menu/options button in a rider-facing user interface, such as menu/option button 316 of user interface 302 of FIG. 3.

In the example shown, display page 402 includes a set of vehicle rider-related options/controls 404. As shown, the additional options/controls include controls to access options/functionality to ride a selected vehicle, to make payments, e.g., for a recently-completed ride or to add to a balance debited to pay for rides; a "free rides" button to learn about incentives and/or promotions that may enable a user to earn a free ride; a "ride history" button to review one's own history of use of on demand vehicles; a "how to ride" button to access video or other tutorials on how to ride on demand electric vehicles correctly, safely, legally, etc.; a "safety" button to learn safety tips and rules; a "help" button to access FAQ, help via a chat interface, etc.; and a "settings" button to change settings, such as screen name, default map view, preferred map program to get a route to a vehicle, payment methods, etc.

In various embodiments, free rides may be earned in a variety of ways, including without limitation one or more of: completing a prescribed number of paid rides; accumulating credits for properly using and/or parking vehicles; a bounty for referring other paid users; performing a service with respect to vehicles used or parked by others, such as standing up a vehicle that has fallen or been knocked over; reporting a damaged vehicle or one suspected of being lost or stolen; and suggesting new areas to stage (park) vehicles for rider use.

In various embodiments, selecting the "X" in the upper right corner (or other control) to close the user interface of FIG. 4, while in the charger mode as shown, results in display of a map-based user interface, such as the interface of FIGS. 3A and 3B.

Figure 5:
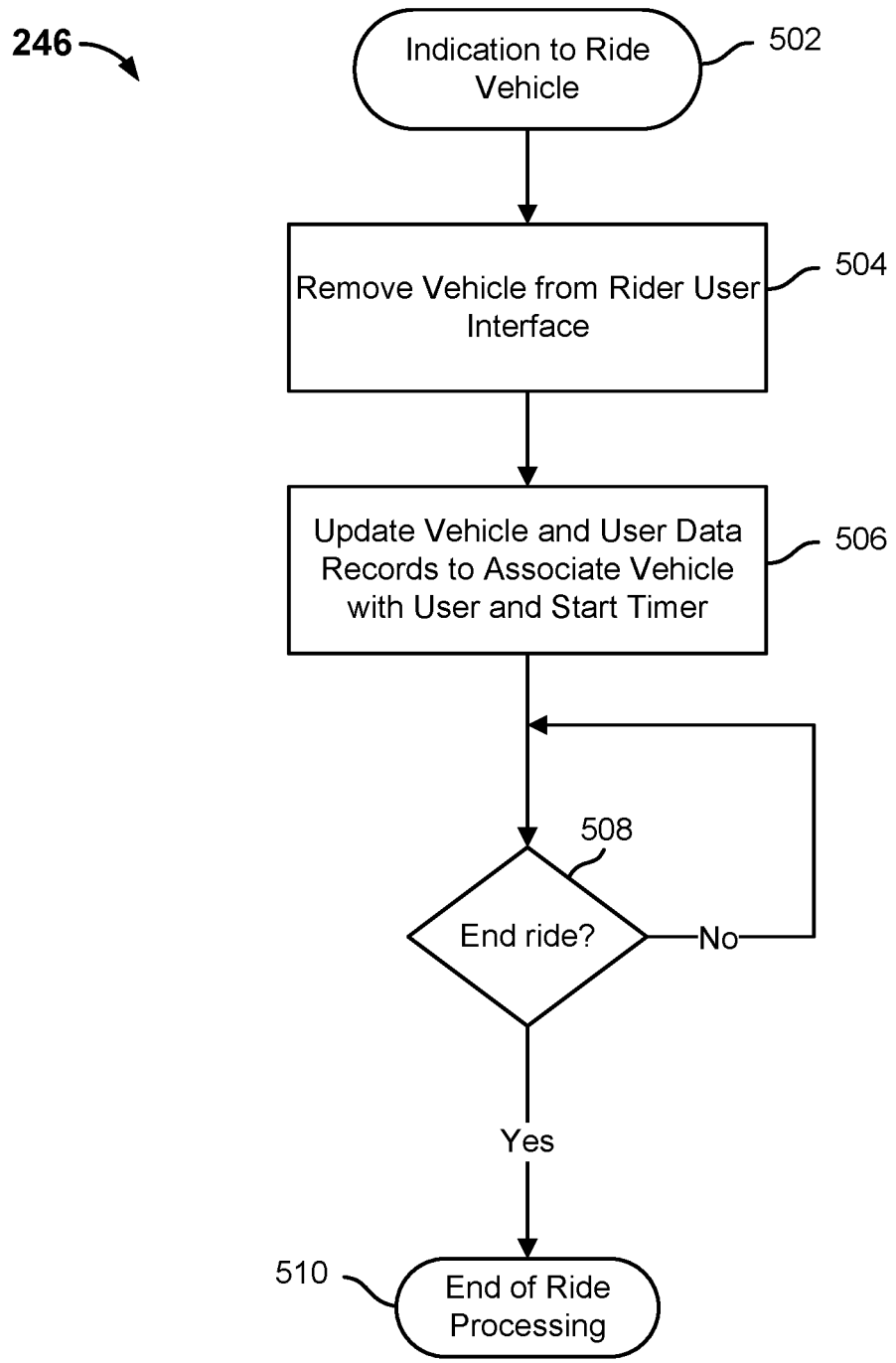
FIG. 5 is a flow chart illustrating an embodiment of a process to receive and process an indication to ride an electric vehicle.

FIG. 5 is a flow chart illustrating an embodiment of a process to receive and process an indication to ride an electric vehicle. In various embodiments, the process of FIG. 5 is performed by a backend server, such as backend server 112 of FIG. 1A, based on information received from one or both of vehicles comprising a fleet of on demand electric vehicles and one or more mobile devices associated with a user. In various embodiments, the process of FIG. 5 is performed to implement step 246 of FIG. 2C.

In the example shown, an indication to ride a vehicle is received (502). For example, a user may have provided an indication via a user interface, such as user interface 302 of FIGS. 3A and 3B, to ride a specific vehicle, resulting in an indication to ride the vehicle by that user being sent via the Internet to the backend server. The vehicle is removed from the population of vehicles displayed to riders via a rider-facing user interface (e.g., mobile app) (504). The vehicle and user data records are update to reflect that the vehicle is being used by the user and a ride duration timer is started (506). Upon receiving an indication the ride has ended (508), end of ride processing (e.g., stopping the ride duration timer, returning vehicle to the population available to be rented, processing a payment transaction, etc.) is performed (510).

Figure 6:
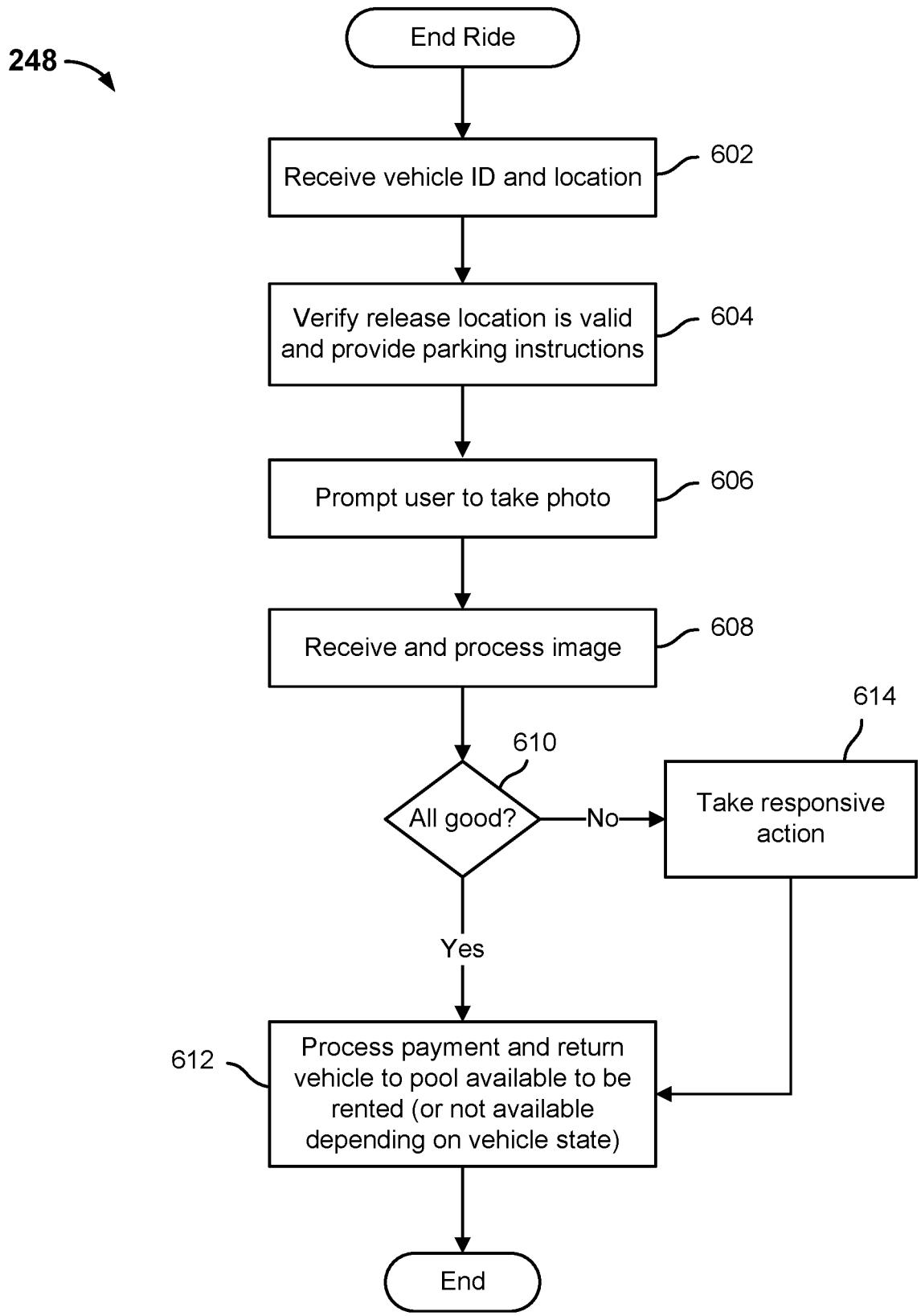
FIG. 6 is a flow chart illustrating an embodiment of a process to perform end-of-ride processing.

FIG. 6 is a flow chart illustrating an embodiment of a process to perform end-of-ride processing. In various embodiments, the process of FIG. 6 is performed by a backend server, such as backend server 112 of FIG. 1A, based on information received from one or both of vehicles comprising a fleet of on demand electric vehicles and one or more mobile devices associated with a user. In various embodiments, the process of FIG. 6 is performed to implement step 248 of FIG. 2C, e.g., upon and/or in connection with receiving an indication that a ride has ended.

In the example shown, one or more of the user identification, vehicle identification, user location, and vehicle location are received (602). It is determined whether the release location (where the rider ended the ride) is a valid location to park the vehicle and parking instructions are provided to the rider (604). In some embodiments, if the end of ride location is not a permitted location to park the vehicle, the user is prompted to move the vehicle (e.g., push, ride, ride for free, etc.) to a permitted location, e.g. a nearest permitted location, a preferred location, etc. In various embodiments, the parking instructions may be generic (e.g., parked upright on kickstand, not blocking walkways, doors, crosswalks, fire hydrants or other safety equipment, handicap access, etc.), specific (e.g., information about specific preferred, permitted, and/or prohibited locations at or near the location at which the user ended the ride), or a combination of both. The user is prompted, e.g., via the mobile app, to take a photo of the vehicle as parked (606). The image is received and processed to determine via automated processing (e.g., machine learning-trained classifier) whether the vehicle is parked correctly (e.g., upright, not blocking doors or walkways, etc.) (608). In some embodiments, if it cannot be determined via automated processing of the image whether the vehicle is parked correctly, the image may be sent automatically for human review.

If the image processing and/or review indicate(s) the vehicle is part incorrectly, responsive action is taken (614). For example, the user may be prompted to (more) correctly park the vehicle.

Once the vehicle is determined to have been parked correctly and/or responsive action is taken (610, 614), a payment transaction for the ride is processed and the vehicle is returned to the pool of vehicles available to be rented (612).

Figure 7:
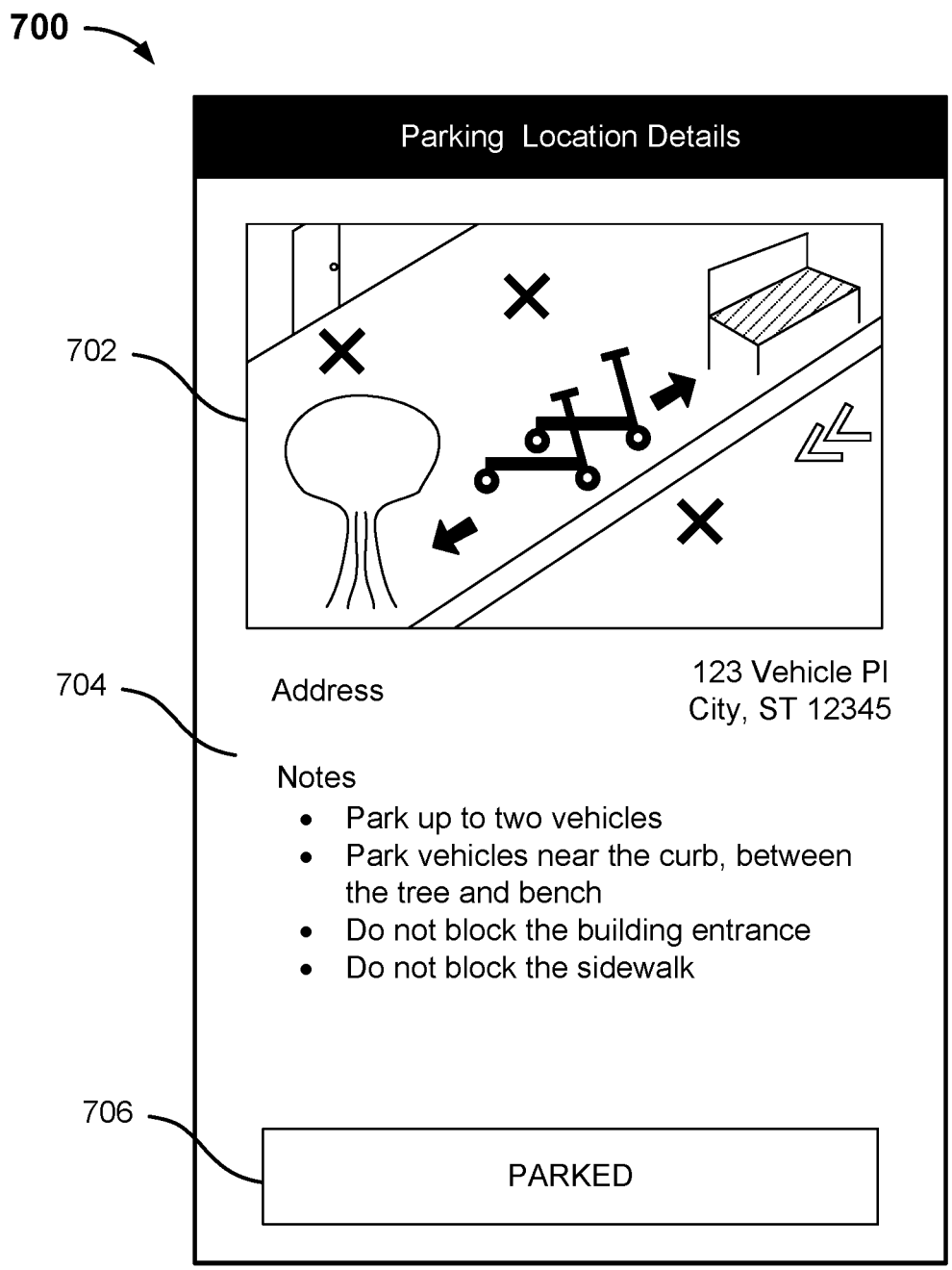
FIG. 7 is a diagram illustrating an embodiment of a user interface to provide instructions to properly park a vehicle at a specific location.

FIG. 7 is a diagram illustrating an embodiment of a user interface to provide instructions to properly park a vehicle at a specific location. In some embodiments, the display 700 of FIG. 7 is displayed upon receiving an indication to end a ride at a location for which location-specific parking instructions are available.

In the example shown, display 700 includes a graphical representation 702 of the correct location and manner to park vehicles at the location. The graphical representation may be a drawing, computer graphic, photograph, and/or a mix of one or more of the above. Areas at which vehicles are permitted/desired to be located and the manner of parking them are represented by vehicle images/drawings. Points of reference, obstacles, and other features are represented and areas in which vehicles should not be placed, such as doorways, walkways, bike paths, roadways, etc., are marked with an "X". A text display area 700 displays information about the location, including in this example the street address and notes regarding how vehicles should and should not be left at the location. A control 706 enables a user to indicate a vehicle has been parked at that location.

For locations for which specific parking instructions are not available, in various embodiments a display page providing generic information about how to properly park a vehicle may be displayed.

Techniques are disclosed to provide over-the-air control of vehicles comprising a fleet of electric vehicles made available for on demand use, such as on demand rental. In various embodiments, techniques disclosed herein may be used to prevent or discourage vehicle movement, e.g., during times when a vehicle has not been rented and/or is otherwise not currently authorized to be used.

"Over-the-air" refers to the ability to communicate with and control certain aspects of a vehicle without requiring that the control system or device be in the same or a very nearby location as the vehicle, although in various embodiments "over-the-air" techniques can also be used if you are in the same physical location as the vehicle.

In various embodiments, vehicle movement is prevented and/or discouraged by restricting, dampening, applying a force resisting, or otherwise minimizing movement of the vehicle's wheels. A non-exhaustive list of ways to restrict or minimize vehicle wheel movement in various embodiments includes one or more of:

Regenerative braking techniques

A physical disc brake or other type of physical braking system to prevent wheel movement Similar to regenerative braking, a motor can be used to spin the wheel in the opposite direction as the vehicle is being or attempted to be pushed In some embodiments, techniques other than and/or in addition to braking are used to prevent or discourage vehicle movement. In some embodiments, techniques are used to discourage a non-authorized person from moving the vehicle by controlling the vehicles to execute actions such as emitting an audible alarm or flashing the vehicle's lights.

In various embodiments, certain events can be defined to trigger a state of the vehicle that will discourage or prevent vehicle movement. Such events include but are not limited to:

GPS location

Time of day

Onboard sensors such as accelerometers, gyroscopes, visual onboard sensors, etc or any combination thereof Weather In various embodiments, techniques disclosed herein may be used to remotely control a vehicle in a variety of circumstances, including one or more of:

Facilitate safety of the rider

Prevent vehicle theft

Assist in adhering to local regulations

Maximize availability of the vehicles for rent

In some embodiments, remote vehicle-control is used to facilitate rider safety by preventing riders who are not fit to ride safely or by changing vehicle settings to protect riders from dangerous driving. Examples of instances of this include one or more of:

The rider is not of a minimum age to be trusted with operating the vehicle

The rider does not have the proper certifications to operate the vehicle according to local regulations, the discretion of the operating company who is offering the vehicles, or other necessary certifications The environment that the vehicle is riding in isn't conducive to safe-driving (e.g. weather, time of day, location, etc.)

The rider has specifically requested that they do not want to travel above a certain speed on the vehicle An educated guess has been made that the rider wants the vehicle to behave in a certain way (e.g. a lower maximum speed) given certain aspects of their user profile In various embodiments, vehicles comprising an on-demand fleet of electric vehicles may not be "docked" or locked to any physical structures. In various embodiments, techniques disclosed herein are used to discourage and/or prevent unauthorized use, theft, abuse, etc. Locking the wheels, emitting an audible sound from the vehicle, and flashing vehicle lights, are a few examples of mechanisms triggered automatically in various embodiments upon certain vehicle events (explained further below) and/or that can be triggered manually from a remote location.

Adhering to local laws and regulations may be a requirement for on-demand electric vehicle fleets. Varying cities, states, etc. may dictate that various rules must be followed such as a minimum age requirement, a maximum speed threshold, limiting usage to specific areas, limiting usage to specific times of day, limiting usage to specific types of weather, or more. The ability to remotely control vehicles makes it immensely easier for the entire fleet to adhere to these regulations.

Maximizing the availability of the vehicles is another aspect of managing on-demand electric vehicle fleets in some embodiments. For instance, in some embodiments, vehicles that are located indoors or outside acceptable operational boundaries are locked as disclosed herein to encourage moving the vehicles into areas where they can be more easily rented by riders.

In various embodiments, events can be defined and/or configured to trigger communication with and control of an electric vehicle as disclosed herein. A few possibilities are listed below:

A rider has ended a ride

The vehicle is positioned in certain ways, such as if a supporting mechanism (e.g. a kickstand) is activated or if the scooter is tipping, where activating the wheel-brakes or sounding the alarms can prevent damage to the vehicle or harm to the rider If the vehicle's connection to the internet or other devices (such as a smartphone, smartwatch, etc.) is disconnected for a prolonged period of time In various embodiments, measures are in place to ensure braking mechanisms are not activated in situations where it may cause damage to itself or to the rider. In some embodiments, certain factors must overrule other variables in the system. For instance, if the vehicle is moving, it should not activate an automated trigger of a braking mechanism (e.g. a kickstand being activated) so as to not to cause the vehicle to brake suddenly without the user's input.

Figure 8A:
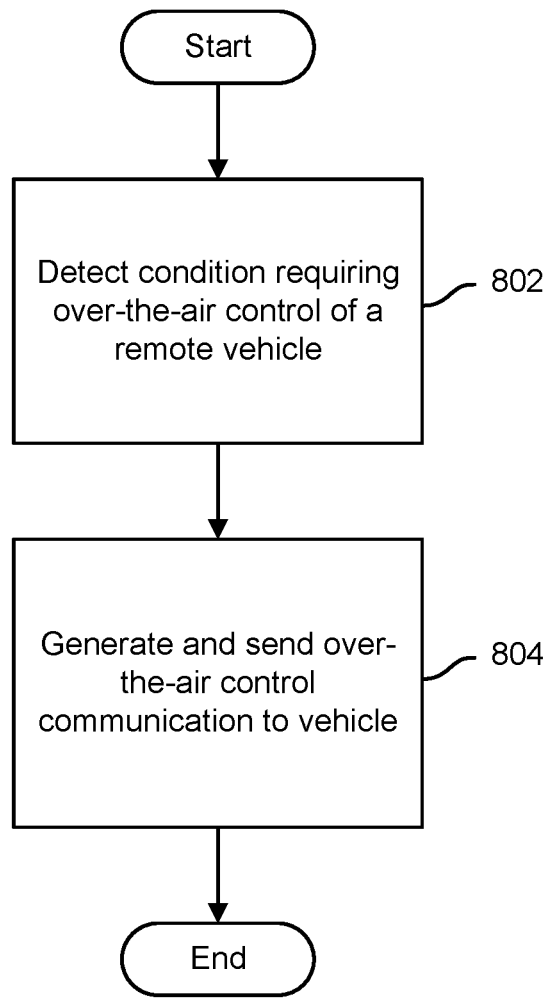
FIG. 8A is a flow illustrating an embodiment of a process to control on demand electric vehicles via over-the-air communications.

FIG. 8A is a flow illustrating an embodiment of a process to control on demand electric vehicles via over-the-air communications. In various embodiments, the process of FIG. 8A is performed by a backend server, such as backend server 112 of FIG. 1A. In the example shown, a condition that requires over-the-air control of a remote vehicle is detected (802). Examples including, without limitation, receiving an indication to unlock the vehicle for use by an authorized user; receiving geo-location information indicating the vehicle has entered or is about to enter an area subject to a restriction, such as a speed limit, a required lighting configuration, an audible warning sound, etc.; receiving an indication to regulate vehicle speed or other attributes according to a user profile; etc. One or more control communications associated with the detected condition are generated and sent over-the-air to the vehicle (804). In various embodiments, the vehicle is responsive to the command to configure and/or control itself in a manner indicated by and/or otherwise associated with the communication(s).

Figure 8B:
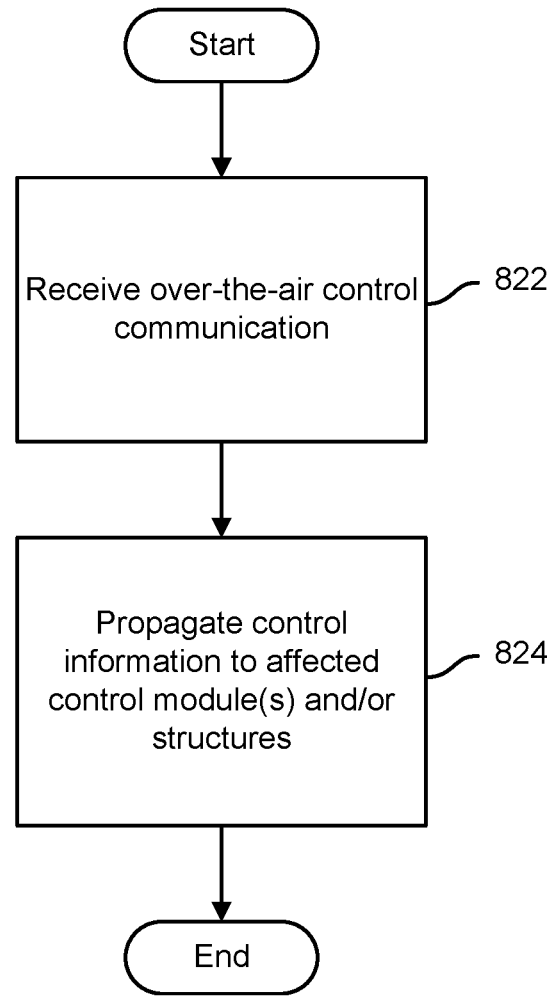
FIG. 8B is a flow illustrating an embodiment of a process to control on demand electric vehicles based on over-the-air communications.

FIG. 8B is a flow illustrating an embodiment of a process to control on demand electric vehicles based on over-the-air communications. In various embodiments, the process of FIG. 8B is performed by control modules installed on electric vehicles comprising a fleet of electric vehicles made available for use on demand. In the example shown, a control communication is received at the vehicle via an over-the-air communication (e.g., cellular, Wi-Fi, SMS, etc.) (822). The control information is propagated to one or more control modules and/or structures configured to respond to the control information in a prescribed manner (824). For example, a control signal may be sent to a motor controller to cause regenerative braking elements to be used to deter movement of the vehicle. Or, a control signal may be sent to a lock controller or other module configured to activate a physical lock, such as to engage a friction or other mechanical wheel lock.

Figures 9A, 9B:
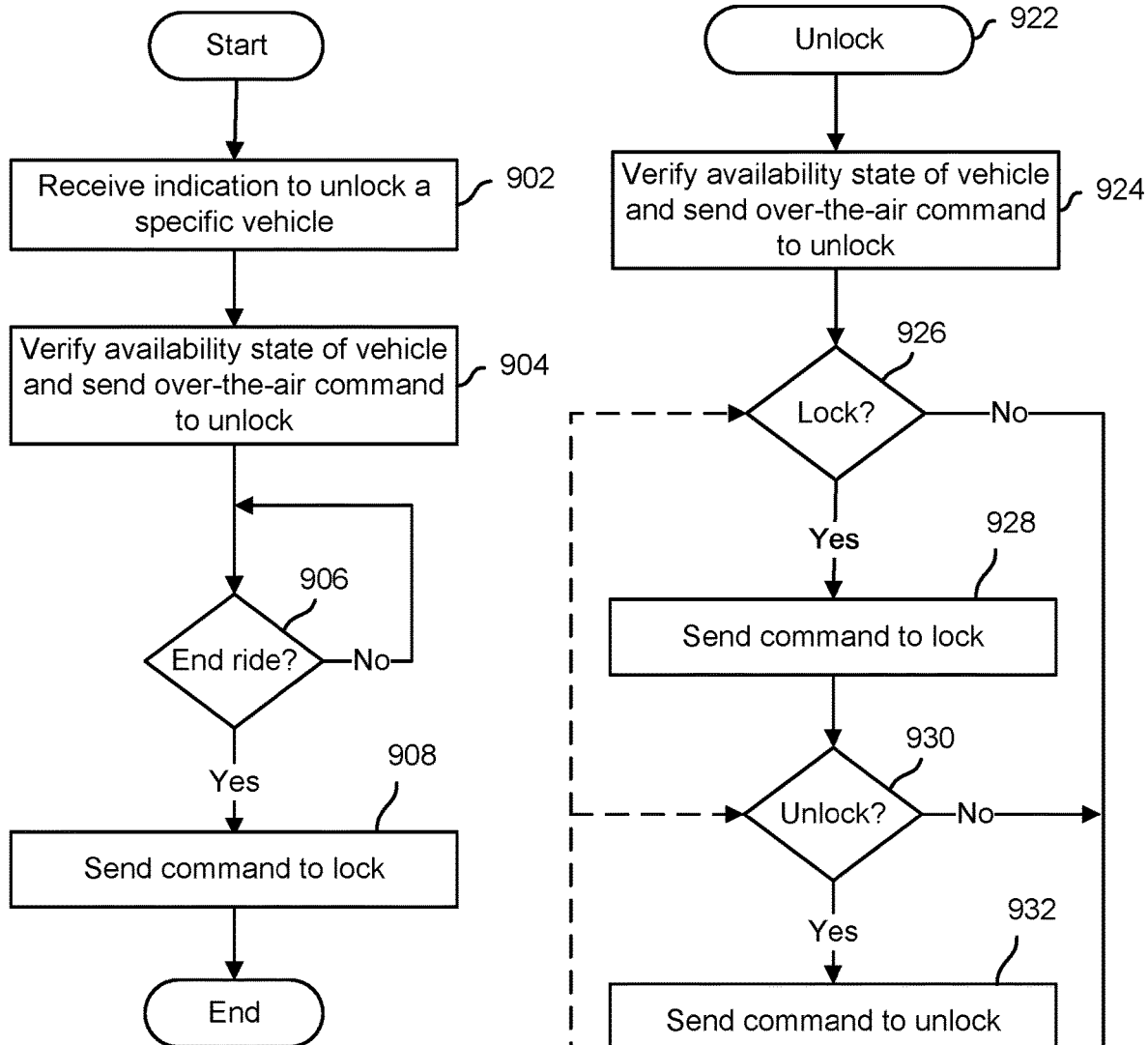
FIG. 9A is a flow illustrating an embodiment of a process to lock and unlock on demand electric vehicles via over-the-air communications.
FIG. 9B is a flow illustrating an embodiment of a process to lock and unlock on demand electric vehicles via over-the-air communications.

FIG. 9A is a flow illustrating an embodiment of a process to lock and unlock on demand electric vehicles via over-the-air communications. In various embodiments, the process of FIG. 9A is performed by a backend server, such as backend server 112 of FIG. 1A. In the example shown, an indication to unlock a specific vehicle is received (902). For example, a rider may have scanned a QRC or other code visible on the vehicle to indicate a desire to rent and ride the vehicle. An availability state of the vehicle is verified and a command to unlock the vehicle is sent over-the-air (904). The vehicle remains unlocked, in this example, until an indication is received that the ride has ended (906), upon which an over-the-air communication to lock the vehicle is sent (908).

FIG. 9B is a flow illustrating an embodiment of a process to lock and unlock on demand electric vehicles via over-the-air communications. In various embodiments, the process of FIG. 9B is performed by a backend server, such as backend server 112 of FIG. 1A. In various embodiments, a user may use the over-the-air locking feature to lock the vehicle without ending the rental period. For example, a user may use this feature to lock the vehicle while the user frequents a place of business, goes to work, uses a restroom, etc. In some embodiments, the user invokes this feature by choosing an option to "lock" the vehicle in an interface page of a mobile app used to rent the on demand electric vehicles. Once the user is ready to ride again, the user provides an input via the mobile app to "unlock" the vehicle. Alternatively, the user may indicate to "end" the ride.

In the example shown in FIG. 9B, upon receiving an indication to unlock a vehicle (922), the availability state of the vehicle is verified and a control communication to unlock the vehicle is sent over-the-air (924). If an indication is received (e.g., via the mobile app interface) to lock the vehicle without ending the ride (926), a command is sent over the air to lock the vehicle (928). If subsequently an indication is received (e.g., via the mobile app interface) to unlock the vehicle once again (930), a command is sent over the air to unlock the vehicle (932). The user in this example may successively lock and unlock the vehicle (926, 928, 930, 932) as/if desired until the user is ready to end the ride (934), upon which a command is sent over-the-air to lock the vehicle (if not already locked) (936) and the process of FIG. 9B ends.

FIG. 10A is a block diagram illustrating an embodiment of a system to lock and unlock an on demand electric vehicle based on over-the-air communications. In various embodiments, the system of FIG. 10A is included in an on demand electric vehicle to enable the vehicle to be controlled remotely via over-the-air communications, as disclosed herein.

In the example shown in FIG. 10A, the system includes a battery 1002 that supplies power to an electric motor 1004 via a motor controller 1006. The motor 1004 drives a transmission (e.g., gearbox, belt drive, etc.) 1008 to apply torque to wheel 1010. In various embodiments, motor controller 1006 includes regenerative braking elements. The regenerative braking elements use motor 1004 as a generator to convert kinetic energy lost when decelerating back into energy stored in the battery 1002. In various embodiments, motor controller 1006 is responsive to control signals received over-the-air via communication interface 1012 (e.g., Wi-Fi, Bluetooth, cellular, SMS, etc.) and over-the-air controller 1014. In this example over-the-air controller 1014 routes control signals to motor controller 1006. In some embodiments, over-the-air controller 1014 maps control signals received via communication interface 1012 to corresponding inputs recognized by motor controller 1006.

In various embodiments, upon receiving an indication to "lock" (deter movement of) the vehicle, motor controller 1006 activates and/or configures the regenerative braking elements to require an unauthorized user to push the vehicle with sufficient force to drive the motor 1004 as a generator to charge the battery 1002, effectively preventing the vehicle from being used in a manual mode, e.g., as a push scooter instead of an electrically-powered scooter, in the case of a vehicle that is an electric scooter.

In some embodiments, the motor controller 1006 is configured when in the "locked" mode to use an opposite-acting motor to apply a torque in an opposite direction of rotation to the direction in which an unauthorized user is attempting to push or ride the vehicle.

In various embodiments, the motor controller 1006 is responsive to an "unlock" command received over-the-air via communication interface 1012 and over-the-air control module 1014 to allow the vehicle to be moved and used normally. For example, the regenerative braking elements may be configured to perform only normal regenerative braking, e.g., to generate charge for battery 1002 when braking.

FIG. 10B is a block diagram illustrating an embodiment of a system to lock and unlock an on demand electric vehicle based on over-the-air communications. In various embodiments, the system of FIG. 10BA is included in an on demand electric vehicle to enable the vehicle to be controlled remotely via over-the-air communications, as disclosed herein.

In the example shown in FIG. 10B, the system includes a communication interface 1022 configured to receive an over-the-air command to lock or unlock the vehicle. The command is provided to an over-the-air control module 1024 which in this example is configured to operate a remotely-controlled physical lock 1026. In this example, physical lock 1026 when activated physically engages wheel 1028 in a manner that prevents or deters vehicle movement or use. For example, in some embodiments remotely-controlled physical lock 1026 comprises a solenoid operated plunger or other structure that extends into, against, or through wheel 1028 to prevent or inhibit rotation of wheel 1028 when remotely-controlled physical lock 1026 is in the locked state. For example, in some embodiments, an unlock command received via communication interface 1022 results in over-the-air control module 1024 supplying a voltage or other signal to remotely-controlled physical lock 1026 to activate the solenoid to retract the physical lock. At the end of the ride, a command to lock the vehicle is received via communication interface 1022, resulting in over-the-air control module 1024 no longer supplying the voltage or other signal to remotely-controlled physical lock 1026, resulting in the physical lock returning (e.g., under spring or other loading) to the locked position.

Figure 10C:
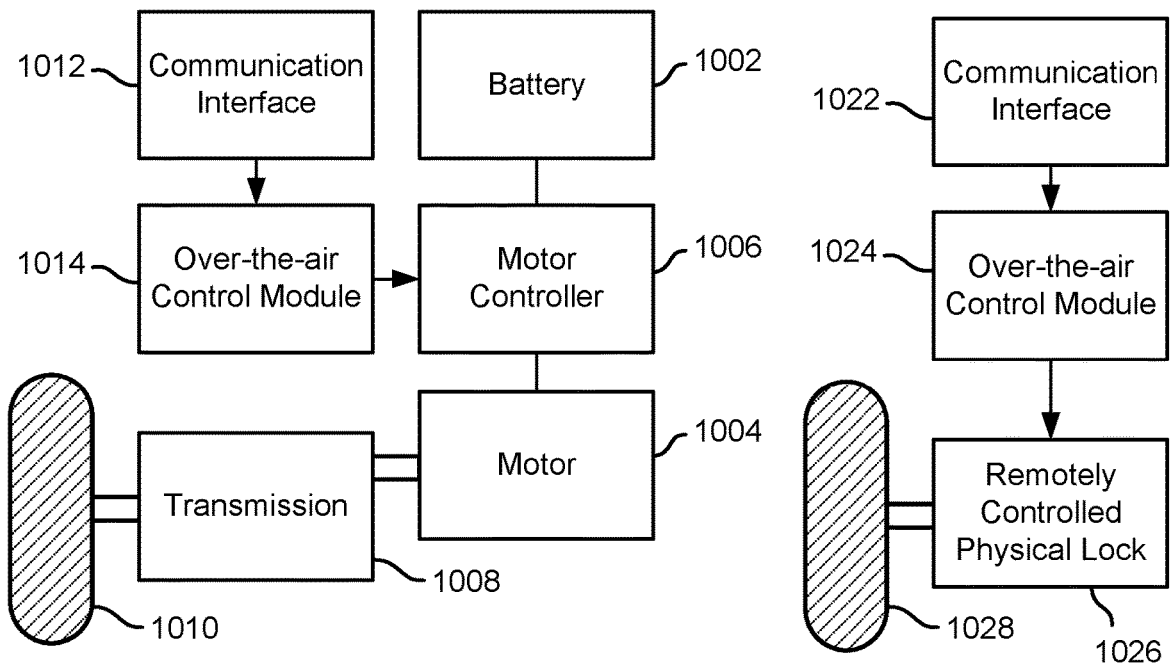
FIG. 10C is a block diagram illustrating an embodiment of a system to control an on demand electric vehicle based on over-the-air communications.
Figure 10C:
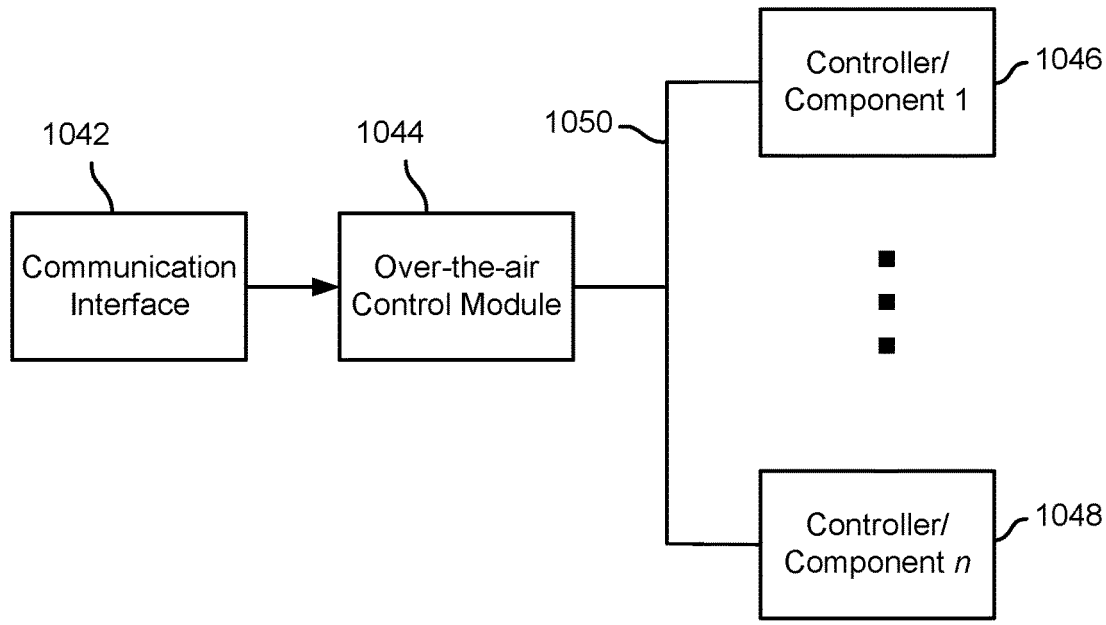

FIG. 10C is a block diagram illustrating an embodiment of a system to control an on demand electric vehicle based on over-the-air communications. In various embodiments, the system of FIG. 10A is included in an on demand electric vehicle to enable the vehicle to be controlled remotely via over-the-air communications, as disclosed herein. In various embodiments, the system of FIG. 10C enables functions and features other than locking or unlocking the vehicle to be controlled.

In the example shown in FIG. 10C, the system includes a communication interface 1042 configured to receive over-the-air control communications and to provide associated information to over-the-air control module 1044. Over-the-air control module 1044 communicates via a communication bus 1050 with controllers and/or controlled components represented in FIG. 10C by controllers/components 1046 and 1048.

In various embodiments, over-the-air control module 1044 maps control communications received via communication interface 1042 to corresponding control signals to which the controlled controllers/components 1046, 1048 are configured to respond and routes the mapped control signals to the appropriate one(s) of the controllers/components 1046, 1048.

In various embodiments, a physical lock is used to prevent vehicle movement. This physical lock may be of various types of materials and form factors, including a solid "D" or "U" shape, a chain, or a wire. The physical lock may lock the wheel, e.g., by extend around, on, or through the wheel. The physical lock may lock the wheel to an adjacent stationary structure of the electric vehicle, such as the frame, prevent the wheel from moving (e.g., rotating about its axis).

In various embodiments, the physical lock may be used to lock the vehicle to a rack, pole, or other immobile structure. In some embodiments, the physical lock may be retractable, e.g., by a spring or other mechanism. When the vehicle is in use, the lock remains stowed in the retracted position. When the ride ends and the vehicle is parked, the user is prompted, e.g., via a mobile app used to rent the vehicle, to lock the vehicle. In some embodiments, the physical lock is released from its retracted or stowed state, e.g., via the mobile app, near field communication from the mobile app to the lock via the user's mobile device, over-the-air command sent to the vehicle directly via the cellular, Wi-Fi, or other network, etc. In some embodiments, the user deploys the physical lock and provides verification the vehicle has been locked, such as one or more of selecting a button or other control via the mobile app, taking a photo of the locked vehicle, etc. To ride a vehicle, a user scans or enters a vehicle code, resulting in the physical lock being unlocked, for example via the user's mobile device or over-the-air directly to the vehicle and/or lock. The rider removes the physical lock from around the rack or other structure to which the vehicle was locked, and stows the lock and/or allows it to be stowed (e.g., by being retracted to and/or into the vehicle, resulting in the vehicle being unlocked and ready to ride.

In some embodiments, the mobile app provides user geo-location data to a backend server that tracks the user's movement toward a location in which a vehicle the user intends to ride (e.g., one the user has already rented and/or reserved) and as the user nears the vehicle the physical lock is unlocked, which requiring any explicit input from the user, so that the vehicle is ready for use the moment the user arrives.

In various embodiments, the lock may be attached on the vehicle at all times. It may be bolted onto the vehicle as its own separate system from the vehicle, or it may be completely integrated with the vehicle's design. The lock may be powered by the vehicle's battery or contain its own battery. The lock may also be solar powered.

In order to move from the unlocked to the locked state and vice versa, in various embodiments, the lock is spring-loaded, motorized, and/or incorporates a retractable cord reel.

In various embodiments, the lock is designed in such a way that it goes through the wheel, the main frame of the vehicle, the handlebars (or any other steering mechanism), or any other part of the vehicle that restricts vehicle movement.

In some embodiments, the lock has access to the internet. The lock can either access the internet directly through its own set of internet-connected hardware, or it may depend on the vehicle for internet connectivity. In communicating with the vehicle, the lock may use a variety of technologies such as Bluetooth, universal asynchronous receiver-transmitter (UART), or other wired or wireless technologies.

In various embodiments, the lock is locked or unlocked automatically, semi-automatically, or completely manually by the user. In various embodiments, the lock automatically locks if a user ends a ride (e.g., wheel or steering mechanism lock), if it senses that it is near a structure it can be locked onto (e.g., based on geo-location, contact sensor, computer vision, RF tag on rack or pole), if it senses that it is being stolen (e.g., movement detected when vehicle is not in an authorized use state), etc. In some embodiments, the lock automatically unlocks if it senses that a rider is within a pre-defined GPS locational area.

In some embodiments, the lock can be locked and unlocked manually by a user. For example, if a user would like to keep the vehicle in place but would like to have access to the vehicle when the user returns to the vehicle's location. In some embodiments, a mobile app used to rent the vehicle includes options for the user to lock and unlock the vehicle for short periods during (e.g., without ending) a rental.

When a rider ends a ride, in various embodiments the application communicates to the vehicle to either lock the vehicle, or allow for the user to physically manipulate the lock in such a way where the user can lock the vehicle to a nearby structure. For example, in some embodiments the user pulls a cable or other lock from a position to which it had been retraced during vehicle user, and extends the cable or other structure around a rack or other structure to which the vehicle is to be locked and inserts a free (e.g., distal) end of the lock into a mechanism into which the free end is received and locks.

In various embodiments, the vehicle does not allow the user to accelerate if the lock is not properly stowed. In some embodiments, there are multiple redundancies in place to ensure that the lock will not activate while the vehicle is in a ride. In some embodiments, if the lock activates during a ride, the vehicle automatically brakes, and the cloud backend is notified that the lock was activated during the ride.

In some embodiments, if the lock loses the ability to wirelessly communicate with other parts of the overall system such as the software application, the cloud backend, etc., the lock may be physically unlocked by a human present at the vehicle. This is accomplished in various embodiments by methods such as an electrical jumpstart or by a master key.

In some embodiments, a physical lock is deployed and/or required to be used based at least in part on geo-location. Geo-fencing and other techniques may be used in various embodiments to determine whether a vehicle is being parked in a location that requires a physical lock to be deployed. In some embodiments, crime statistics, vehicle loss and damage experience data, etc., may be used to determine geo-locations at which physical locks will be required. Other context data, such as time of day, day of the week, etc. may be used. For example, a vehicle may be required to be locked when parked at night.

In various embodiments, techniques disclosed herein facilitate authorized and/or remotely controlled use of on demand electric vehicles, while deterring or preventing unauthorized use, theft, vandalism, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a communication interface; and
   a processor coupled to the communication interface and configured to:
      receive via the communication interface data associated with a vehicle;
      determine based at least in part on the received data that a condition associated with control of the vehicle is satisfied; and
      generate in response to the determination and send to the vehicle via the communication interface instructions to park and lock the vehicle at a location;
      receive via the communication interface an image of the vehicle at the location; and
      process the image of the vehicle at the location to determine whether the vehicle is parked and locked correctly in a manner as indicated by the instructions to park and lock the vehicle.

2. The system of claim 1, wherein the vehicle is an electric vehicle.

3. The system of claim 1, wherein the vehicle is included in a fleet of vehicles made available for on demand use.

4. The system of claim 1, wherein the received data indicates that a ride associated with the vehicle has ended.

5. The system of claim 1, wherein the data associated with the vehicle includes location data associated with the vehicle.

6. The system of claim 1, wherein the processor is configured to verify whether the vehicle is permitted to park at the location.

7. The system of claim 1, wherein in response to verifying that the vehicle is not permitted to park at the location, the processor prompts a user device to move to vehicle to a permitted location.

8. The system of claim 1, wherein the instructions to park are generic parking instructions.

9. The system of claim 1, wherein the instructions to park are specific parking instructions.

10. The system of claim 1, wherein the received image is processed using a machine learning-trained classifier.

11. The system of claim 1, wherein in response to a determination that the vehicle is not parked and/or locked correctly, the processor is configured to perform a responsive action.

12. The system of claim 11, wherein a user device is prompted to correctly park and/or lock the vehicle.

13. The system of claim 1, wherein the instructions to lock the vehicle at the location cause a physical lock to be released from a retracted state or stowed state.

14. The system of claim 1, wherein the instructions to park and lock the vehicle at the location are specific to the location.

15. The system of claim 1, wherein the instructions to park and lock the vehicle are provided to and displayed on a user device associated with the vehicle.

16. The system of claim 1, wherein in response to receiving the instructions to park and location the vehicle, a user device associated with the vehicle is configured to provide a graphical representation of a correct location and manner to park the vehicle at the location.

17. The system of 16, wherein the graphical representation includes one or more indications of where the vehicle is not permitted to be parked.

18. The system of claim 16, wherein the graphical representation includes one or more indications of where the vehicle is permitted to be parked.

19. A method, comprising:
- receiving via a communication interface data associated with a vehicle;
- determining based at least in part on the received data that a condition associated with control of the vehicle is satisfied;
- in response to the determination, generating and sending to the vehicle via the communication interface instructions to park and lock the vehicle at a location;
- receiving via the communication interface an image of the vehicle at the location; and
- processing the image of the vehicle at the location to determine whether the vehicle is parked and locked correctly in a manner as indicted by the instructions to park and lock the vehicle.

20. A computer program product embodied in a non-transitory computer readable medium and comprising computer instructions for:
- receiving via a communication interface data associated with a vehicle;
- determining based at least in part on the received data that a condition associated with control of the vehicle is satisfied;
- in response to the determination, generating and sending to the vehicle via the communication interface instructions to park and lock the vehicle at a location;
- receiving via the communication interface an image of the vehicle at the location; and
- processing the image of the vehicle at the location to determine whether the vehicle is parked and locked correctly in a manner as indicted by the instructions to park and lock the vehicle.

* * * * *